(12) United States Patent
Rocheleau

(10) Patent No.: US 9,228,682 B1
(45) Date of Patent: Jan. 5, 2016

(54) TWO-PIECE PIPE FLANGE AND SYSTEMS

(71) Applicant: John W. Rocheleau, Rye, NH (US)

(72) Inventor: John W. Rocheleau, Rye, NH (US)

( * ) Notice: Subject to any disclaimer, the term of this patent is extended or adjusted under 35 U.S.C. 154(b) by 223 days.

(21) Appl. No.: 13/838,034

(22) Filed: Mar. 15, 2013

(51) Int. Cl.
*F16L 23/02* (2006.01)
*F16L 23/036* (2006.01)

(52) U.S. Cl.
CPC ................... *F16L 23/036* (2013.01)

(58) Field of Classification Search
CPC .......... F16L 23/02; F16L 25/06; F16L 25/065
USPC ................. 285/414, 415, 404, 133.3
See application file for complete search history.

(56) References Cited

U.S. PATENT DOCUMENTS

| | | | | |
|---|---|---|---|---|
| 196,084 A * | 10/1877 | Guyer | ......................... | 285/133.3 |
| 901,545 A * | 10/1908 | Morrison | .................... | 285/133.3 |
| 1,126,386 A * | 1/1915 | Butts | .............................. | 285/414 |
| 1,499,063 A * | 6/1924 | Kraft | .............................. | 285/415 |
| 1,898,617 A * | 2/1933 | Church | ......................... | 285/414 |
| 2,016,262 A * | 10/1935 | Arey et al. | ..................... | 285/415 |
| 2,472,307 A * | 6/1949 | Nagel | ............................. | 285/415 |
| 3,418,009 A * | 12/1968 | Pollia | .............................. | 285/414 |
| 4,988,231 A * | 1/1991 | Pettit | .............................. | 285/276 |
| 4,991,881 A * | 2/1991 | Davis et al. | ..................... | 285/414 |
| 5,074,598 A * | 12/1991 | Masseth et al. | ................ | 285/404 |
| 5,163,712 A * | 11/1992 | Sabo et al. | ..................... | 285/414 |
| 7,156,425 B2 * | 1/2007 | Atkinson | .................... | 285/133.3 |
| 7,712,797 B2 * | 5/2010 | Lum | ............................... | 285/414 |
| 7,819,437 B2 * | 10/2010 | Weil et al. | ..................... | 285/414 |
| 8,297,664 B2 * | 10/2012 | Pottier et al. | .................. | 285/414 |
| 8,485,562 B2 * | 7/2013 | Zerrer | ........................... | 285/404 |

* cited by examiner

*Primary Examiner* — David E Bochna
(74) *Attorney, Agent, or Firm* — Michael J. Persson; Catherine E. Napjus; Lawson Persson & Weldon-Francke

(57) ABSTRACT

A flange with a shoulder piece that may be adjusted into different positions within a shoulder piece opening of a base piece. The shoulder piece includes a lip that catches a recessed portion of the base piece so that the shoulder piece is caught and held in position with the base piece. The base piece and shoulder piece may include complimentary indentations and protrusions so as to hold specific positions relative to one another. The base piece and shoulder piece may include base and shoulder screw holes so that the base and shoulder pieces may be screwed into a specific position.

25 Claims, 28 Drawing Sheets

SECTION A-A

SECTION C-C

SECTION A-A

SECTION A-A

SECTION B-B

SECTION A-A

SECTION A-A

SECTION A-A

SECTION A-A

SECTION A-A

SECTION A-A

SECTION A-A

SECTION A-A

SECTION B-B

SECTION A-A

SECTION D-D

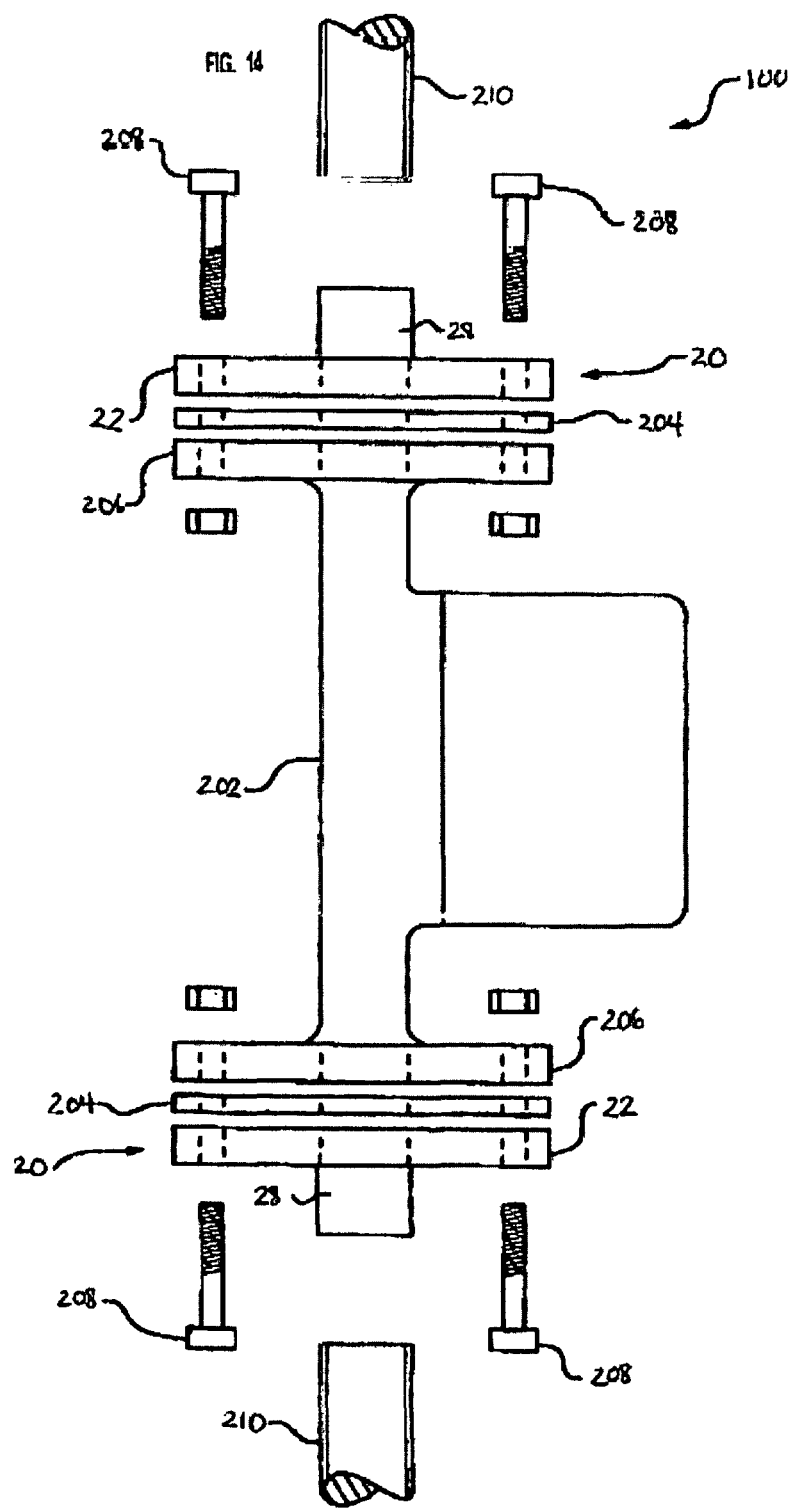

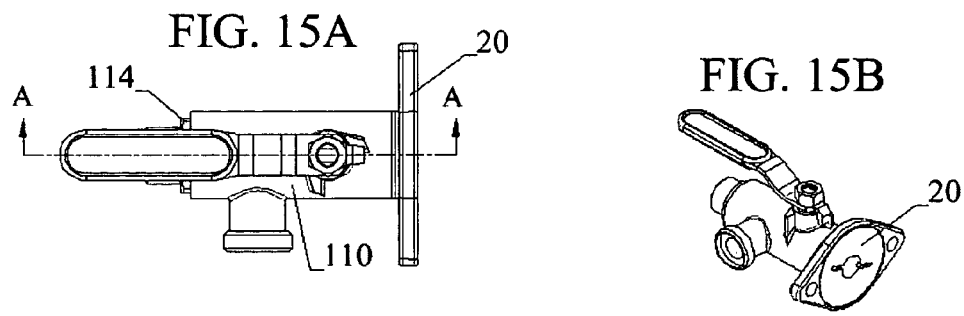
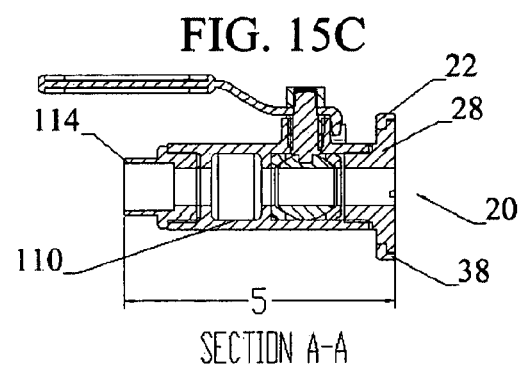
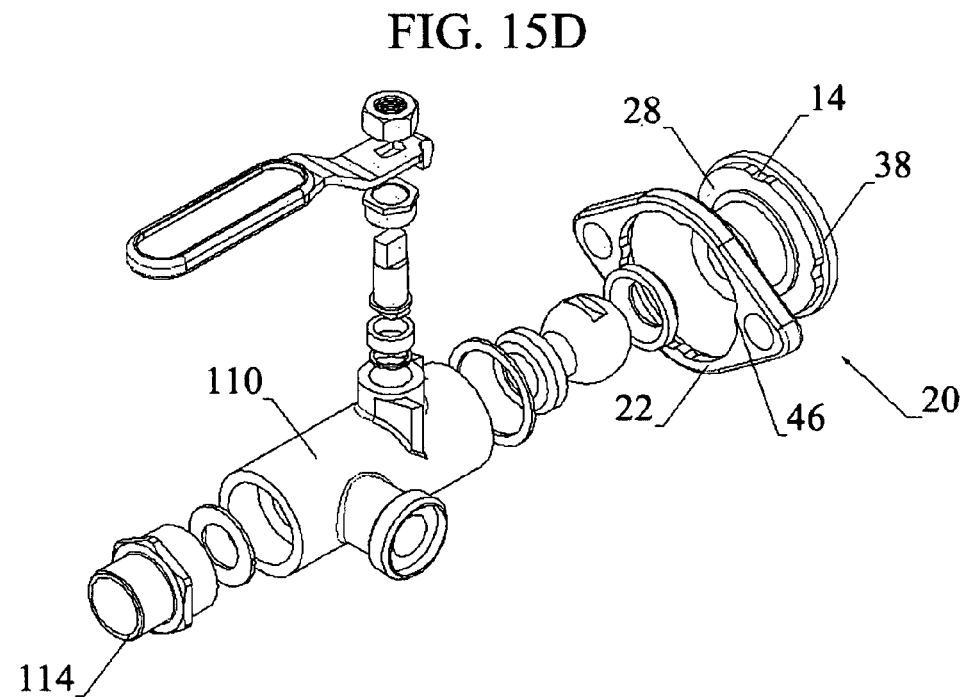

SECTION A-A

SECTION A-A

TWO-PIECE PIPE FLANGE AND SYSTEMS

FIELD OF THE INVENTION

The present invention relates to pipe flanges, and in particular, to pipe flanges allowing position adjustment of the system components attached to the pipe flange.

BACKGROUND

Many piping systems include valves and/or valve and circulator combinations that require a flange to connect the pipe to the valve and/or circulator. When conventional one piece flanges are securely attached, there is often only one position the circulator may take with respect to the flange. As many work spaces are already small, or otherwise awkward, having only one choice in the positioning of the circulator may be problematic for future replacement. The circulator may be forced into a position that it is difficult or awkward to reach for maintenance, or the valve handle of the circulator isolation valve may end up obstructed in one or more directions by the circulator so that the handle cannot be turned all the way in one or more directions, thus affecting valve function.

Flanges are also typically used to connect circulators or other pumps to other parts of a piping system. In order to work properly, circulators must be oriented in a specific orientation so that the circulator motor is always in a horizontal position relative to the motor shaft. Damage to the motor can result otherwise. However, the flanges of a circulator volute are fixed and are oriented in either a horizontal or vertical plane relative to the circulator motor, which can make it impossible to replace a faulty circulator with one that a plumber or HVAC professional may have with him that has volute flanges oriented 90° from the flanges on the circulator that must be replaced. The plumber or HVAC professional may simply attach a new circulator of the same volute flange orientation to the existing flanges, but would need to remove and reattach the existing flanges in order to utilize a circulator he may have with him with a volute flange orientation 90° from the installed flanges in the system. It is usually more cost effective to simply install a replacement circulator of the same volute flange orientation.

There are currently two-piece flanges on the market that allow the orientation of the flange to be altered relative to the pipe. Unfortunately, when these flanges are used to attach circulators, the weight of the circulator can eventually force the circulator to rotate and become misaligned relative to other components in the system. Circulator motors must always maintain a horizontal position relative to the motor shaft, per manufacturers' instructions.

Therefore there is a need for a flange that allows a valve to be attached thereto in more than one position and that will not rotate from the weight of a circulator.

SUMMARY OF THE INVENTION

The present invention includes two two-piece flanges and systems including a two-piece flange.

In its most basic form, the first two-piece flange of the present invention includes a shoulder piece including a pipe opening with an exterior and an interior, a footing, and a lip, and a base piece including a shoulder piece opening, a recessed portion, and at least two bolt openings.

The two-piece flange also includes at least one protrusion and at least two indentations. In some embodiments, the protrusions extend from the footing of the shoulder piece and the indentations are cut into the shoulder piece opening of the base piece. In other embodiments, the indentations extend from the shoulder piece opening of the base piece and the indentations are cut into the footing of the shoulder piece. The indentations and protrusions are designed to mate with one another so that the base piece and shoulder piece may be moved relative to one another and locked into at least two positions. It is preferred that the two-piece flange include four evenly spaced indentations and four evenly spaced protrusions so that the base piece and the shoulder piece may be positioned and locked into two different positions relative to one another. Unless the number of indentations and protrusions is equal and the indentations and protrusions are evenly spaced around the footing of the shoulder piece and the shoulder piece opening of the base piece, as is preferred, there is always at least one more indentation on the footing of the shoulder piece than there is protrusion on the shoulder piece opening of the base piece. Having more than one protrusion is preferable because the shoulder piece and base piece will be held together more securely, and because it provides more options for shifting the positioning of the base and shoulder pieces relative to one another. Although four or six evenly spaced indentations and protrusions are preferable, other embodiments may include greater than four or six each, or fewer than four or six each.

The indentations are preferably a gentle, shallow, bell-shaped curve, which is preferred due to its relative ease of manufacture. However, the indentations may be many shapes, such as semi-circular, rectangular, triangular, etc., provided they resist rotation of the base piece about the shoulder piece. The protrusions are similarly shaped so as to mate with the indentations.

The shoulder piece of the flange of the present invention is able to be mated to, separated from, and united with the base piece. When mated, the shoulder piece extends from the base piece so that the pipe opening of the shoulder piece is concentric with the shoulder piece opening of the base piece. The pipe opening of the shoulder piece extends through the footing and lip of the shoulder piece and has an interior and an exterior with a bottom. The interior of the pipe opening may include threading with reference to the shoulder portion, as disclosed in the inventor's U.S. Pat. No. 6,742,816, which is incorporated herein by reference. The interior of the pipe opening may also be smooth, for soldering, except for a region of decreased dimension, as disclosed, for example, in FIG. 2B and related text of the inventor's U.S. Pat. No. 6,283,157, which is also incorporated herein by reference. This area of decreased dimension is referred to as an internal step and may be very low, only extending a short way up the interior of the pipe opening, or it may extend some distance up the interior. The exterior of the pipe opening may by sweat or threaded, or may include at least one gripping surface, as disclosed in U.S. Pat. No. 6,742,816, or a leveling flat in the case of a sweat flange. One of ordinary skill in the art will recognize that there are many useful combinations of the various exterior possibilities with the various interior possibilities. The shoulder piece is preferably made of brass, bronze, iron, or copper plated iron.

The footing of the shoulder piece is preferably a circular, flat area extending radially from and perpendicular to the bottom of the exterior of the pipe opening. When the shoulder piece and base piece are mated, the footing is preferably flush with the top of the base piece. The footing may be smaller or larger in area depending on the size of the pipe opening. A shoulder piece with a larger pipe opening will tend to have a smaller footing area and vice versa.

The lip of the shoulder piece is the flat bottom of the shoulder piece. The lip is integral and parallel to the footing of the shoulder piece. The lip extends slightly out from the footing and is the same size and shape as the recessed portion of the base piece so that the lip fits into the recessed portion when the shoulder piece and the base piece are mated.

The base piece of the present invention is a substantially flat piece having a predetermined shape, preferably elliptical or circular, as shown in FIG. 2A and FIG. 4, respectively, of U.S. Pat. No. 6,283,157, in reference to the base portion. The base piece is preferably made of brass, bronze, iron, zinc aluminum, or copper plated metal.

A shoulder piece opening extends through the base piece and is sized and shaped so that the shoulder piece may fit into the shoulder piece opening of the base piece. The base piece has a top and a bottom. The bottom includes a recessed portion sized and shaped to mate with the lip of the shoulder piece, as discussed above. The recessed portion is similar to the recessed portions shown in FIGS. 6 and 7 of U.S. Pat. No. 6,283,157, except that they are designed for fitting with the lip of the shoulder piece, rather than gaskets. In some embodiments, the recessed portion is recessed enough to accommodate both the lip of the shoulder piece and a gasket. Due to the recessed portion, the shoulder piece opening is slightly wider on the bottom of the base piece than on the top. When the shoulder piece is fit into the shoulder piece opening, thus mating the shoulder piece and the base piece, the lip of the shoulder piece fits into and is held by the recessed portion of the base piece, the lip of the shoulder piece is flush with the bottom of the base piece, the footing of the shoulder piece is flush with the top of the base piece, the protrusions and indentations fit together, and the pipe opening of the shoulder piece extends from the base piece.

The base piece also includes at least two bolt openings, such as those described in U.S. Pat. Nos. 6,283,157 and 6,742,816. As a unified flange, embodiments of the flange of the present invention include all configurations described in U.S. Pat. Nos. 6,283,157 and 6,742,816 and shown in FIGS. 2A-C, 3-4, and 6-7 of U.S. Pat. No. 6,283,157 and FIGS. 1-6, 8-9 of U.S. Pat. No. 6,742,816, for example. In addition, some base pieces are flush or flat on top, while some include ridges or other texturing so that they are not flush.

In some embodiments, the two-piece flange includes a screw to hold the base piece and shoulder piece together securely once the correct or desired positioning of indentations to protrusions is selected. In such embodiments, the shoulder piece includes at least two, and preferably three, shoulder screw holes, and the base piece includes at least one, and preferably one, base screw holes. The two-piece flange includes a screw designed to pass through the base screw hole in the base piece and into one of the shoulder screw holes in the shoulder piece, and secure them. It is preferred that the screw and screw hole in the base piece be threaded, and the hole in the shoulder piece be a blind hole. The screw holes in the shoulder piece are parallel to the footing and are drilled above the lip. The screw holes in the base piece are parallel to and between the top and bottom of the base piece and are above the recessed portion. It is understood that the screw holes should be positioned so as to correspond to the possible positions available due to the various combinations of the protrusions and indentations. It is preferred that the screw holes in either the base piece or shoulder piece be through the areas of indentation or protrusion.

The second two-piece flange of the present invention is just like the first two-piece flange except that it does not include protrusions or indentations and it always includes screw holes and a screw. Like the first two-piece flange, the shoulder piece and base piece of the second two-piece flange may move in position relative to one another. As they do not include the affirmative stops of the protrusions and indentations, however, the screw holes and screw are necessary to hold the two pieces in position relative to one another once the preferred position is chosen.

In its most basic form, the first two-piece flange system of the present invention includes two two-piece flanges and a circulator. The base pieces of the two two-piece flanges are attached to circulator volute flanges on either end of the circulator. If a circulator needs to be replaced, and the replacement has the motor in a different orientation than the one being replaced, but the orientation of the circulator motor must be horizontal per manufacturers' instructions, and a ball valve is soldered in place with the shoulder piece of the two-piece flange, then the installer of the replacement circulator need only rotate the base portion of the two-piece flange for attachment to the new circulator so that the new circulator is in the correct horizontal position and avoids conflict with other components adjacent to it, such as a ball valve handle.

Although the circulator and two-piece flanges may be attached by any means commonly used in the art, it is preferred that the circulator volute flanges include at least two circulator bolt openings that align with the bolt openings in the base piece of the two-piece flange. Mounting bolts are passed through the circulator volute flange bolt openings and the corresponding flange bolt openings and secured to nuts to hold the two-piece flanges and the circulator volute together. In some embodiments, a gasket is included and secured between each circulator flange and two-piece flange. The gasket may include corresponding bolt openings so that the mounting bolts will pass through the two-piece flange, the gasket, and the circulator volute flange for securing.

In some embodiments, the two-piece flange system of the present invention includes at least one ball valve. The ball valve will mate with the shoulder piece of one of the two-piece flanges. In some embodiments, the system includes two ball valves attached to the two shoulder pieces of the two-piece flange so that the ball valves will be positioned on either side of the circulator.

In its most basic form, the second two-piece flange system of the present invention includes at least one threaded or sweat two-piece flange as described above, and a male street accessory tee fitting. The male street accessory tee fitting is a tee fitting with three pipe openings. It is preferred that the pipe openings be oriented so that the fitting is in the shape of a "T", with two openings connected to each other through a continuous cylindrical opening, and the third opening perpendicular to the continuous cylindrical opening. Although a "T"-shaped tee fitting is preferred, in some embodiments of the male street accessory tee fitting of the present invention, a lateral, Y piece, cross, or any other type of fitting with at least three pipe openings may be substituted provided that one connection is male street for connecting to a valve associated with the two-piece flange.

Each pipe opening is formed by a body. At least one of the three bodies has a round male street body that has an exterior surface of the body that is the same diameter as a standard pipe and an external step included around the bottom of the body. The external step has a slightly wider diameter than the rest of the body and extends up the body toward the opening. The external step may be of any length so that there is sufficient space between the top of the external step and the end of a valve opening being connected to the male street body so that soldering may occur. Sufficient space is enough to accept the diameter of the solder to be inserted.

The male street body may also include an internal stop for those instances when the male street body is used as a female sweat body. The internal stop provides an affirmative stop for male pipes or accessories being coupled with the body, and also prevents solder from leaking through the body beyond where it is needed. The internal stop is high enough so that when the male end of a pipe or other accessory is mated with the male street body acting as a female body, a small gap is left at the top of the accessory being attached to the male street body. The gap is just large enough to accommodate a standard diameter solder.

It is preferred that at least one of the other two bodies includes a threaded or sweat connection suitable for use with a threaded or sweat tap fitting. A preferred embodiment of this second system also includes a ball valve. A preferred embodiment of this second system also includes a circulator. A preferred embodiment of this second system also includes a threaded or sweat tap fitting.

Therefore it is an aspect of the present invention to provide a two-piece flange where the two pieces of the flange may align with one another in at least two positions relative to one another.

It is a further aspect of the present invention to provide a two-piece flange with several different shoulder pieces attachable to a variety of valves or pipes.

It is a further aspect of the present invention to provide systems including two-piece flanges where the two pieces of the flange may align with one another in at least two positions.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 14 is a side view of the first two-piece flange system of the present invention with its components separated.

FIG. 15A is a side view of a two-piece flange system of the present invention.

FIG. 15B is a perspective view of the two-piece flange system shown in FIG. 15A.

FIG. 15C is a cutaway view of the two-piece flange system shown in FIG. 15A across line A-A.

FIG. 15D is a perspective view of the two-piece flange system shown in FIG. 15A with the system components separated.

DETAILED DESCRIPTION

Figure 1A:
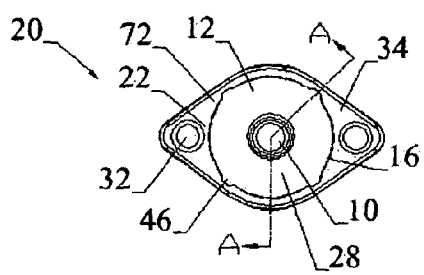
FIG. 1A is a top-down view of a preferred embodiment of the two-piece flange of the present invention.
Figure 1B:
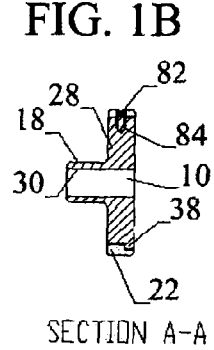
FIG. 1B is a cutaway view of the preferred embodiment shown in FIG. 1A across line A-A.
Figure 1C:
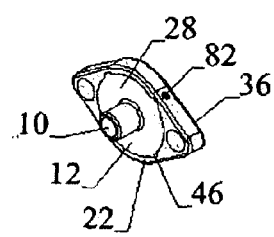
FIG. 1C is a perspective view of the preferred embodiment shown in FIG. 1A.
Figure 1D:
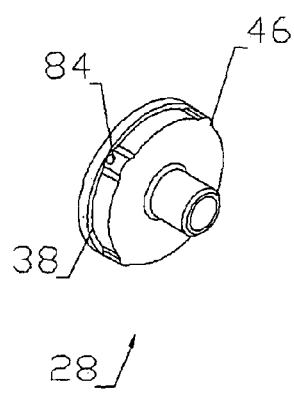
FIG. 1D is a perspective view of the shoulder piece of the preferred embodiment shown in FIG. 1A.
Figure 1E:
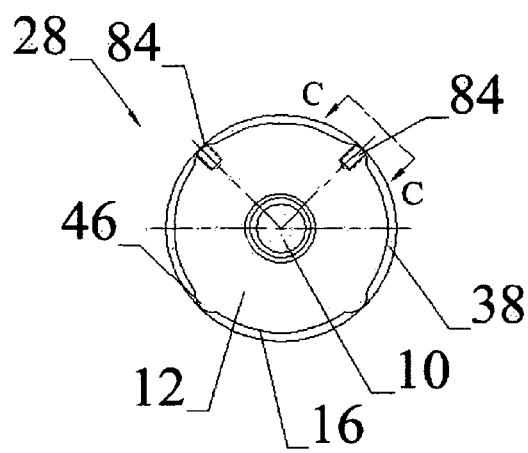
FIG. 1E is a top-down view of the shoulder piece of the preferred embodiment shown in FIG. 1A.
Figure 1F:
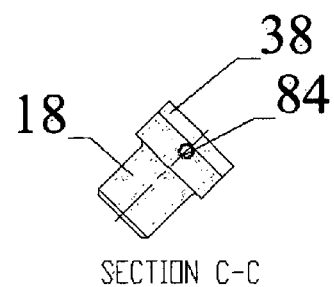
FIG. 1F is a cutaway view of the shoulder piece of the preferred embodiment shown in FIG. 1E across line C-C.
Figure 1G:
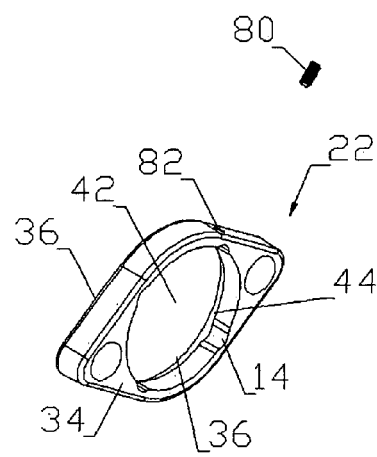
FIG. 1G is a perspective view of the base piece of the preferred embodiment shown in FIG. 1A.
Figure 1H:
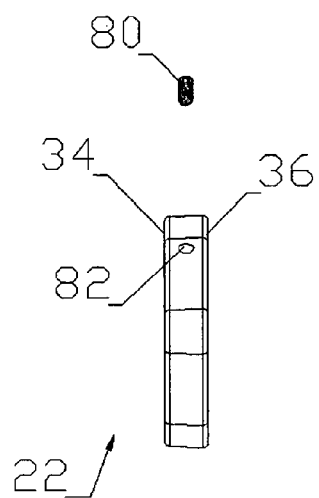
FIG. 1H is a side view of the base piece of the preferred embodiment shown in FIG. 1A.
Figure 1I:
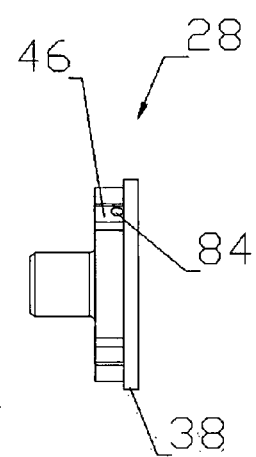
FIG. 1I is a side view of the shoulder piece of the preferred embodiment shown in FIG. 1A.

Common reference numbers refer to similar or common features. Not all features are labeled in every figure, but reference to an unlabeled feature in one figure that is labeled in another figure should be assumed to refer to the same or a similar feature.

FIGS. 1-11 depict the first two-piece flange 20. Each of these two-piece flanges 20 includes a base piece 22 and a shoulder piece 28. These pieces 22, 28 include corresponding protrusions 46 and indentations 14. In FIGS. 1-6, the shoulder piece 28 includes protrusions 46 coming from the outer edge 16 of the footing 12, and the base piece 22 includes indentations 14 in the top 34 around the shoulder piece opening 42. In FIGS. 7-11, the base piece 22 includes protrusions 46 in the top 34 around the shoulder piece opening 42 and the shoulder piece 28 includes indentations 14 in the outer edge 16 of the footing 12. Indentations 14 and protrusions 46 are sized to mate with each other. Indentations 14 and protrusions 46 allow shoulder piece 28 and base piece 22 to be shifted relative to one another and held in specific positions with respect to one another. Although some FIGS. indicate indentations 14 and some indicate protrusions 46, it is understood that if one is present, so is the other.

Four evenly spaced indentations 14 and four evenly spaced protrusions 46 are preferred. Any equal number, greater than one, of indentations 14 and protrusions 46 evenly spaced may be used, however, so that the number of available positions will be equal to the number greater than one. There also may be fewer protrusions 46 than indentations 14 as long as the space between the protrusions 46 (if there are more than one protrusions 46) aligns with the space between the indentations 14. Although there may be only one protrusion 46 that may move between even unequally spaced indentations 14, this is not preferred because more indentation 14/protrusion 46 unions will make for a stronger hold between shoulder piece 28 and base piece 22. There cannot be more protrusions 46 than indentations 14 because at least one protrusion 46 would not have an indentation 14 in which to rest. The reverse is not true because an indentation 14 may remain unfilled by a protrusion 46. Finally, there must be at least two indentations 14 one of which a single protrusion 46 may rest in so that there is more than one position with which the shoulder piece 28 and the base piece 22 may be with respect to one another.

Figure 7A:
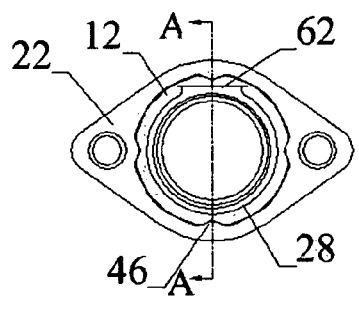
FIG. 7A is a top-down view of a preferred embodiment of the two-piece flange of the present invention.
Figure 7B:
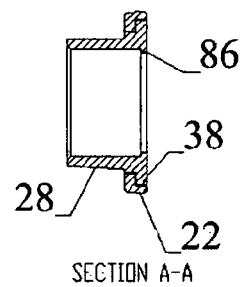
FIG. 7B is a cutaway view of the preferred embodiment shown in FIG. 7A across line A-A.
Figure 7C:
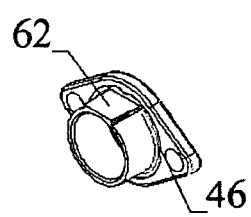
FIG. 7C is a perspective view of the preferred embodiment shown in FIG. 7A.
Figure 8A:
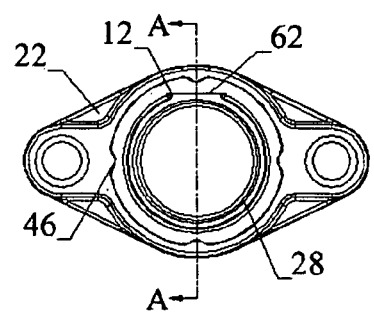
FIG. 8A is a top-down view of a preferred embodiment of the two-piece flange of the present invention.
Figure 8B:
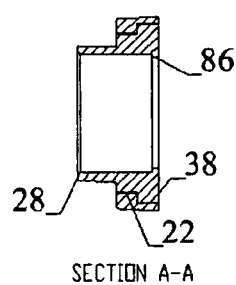
FIG. 8B is a cutaway view of the preferred embodiment shown in FIG. 8A across line A-A.
Figure 8C:
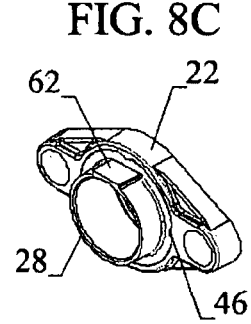
FIG. 8C is a perspective view of the preferred embodiment shown in FIG. 8A.
Figure 9A:
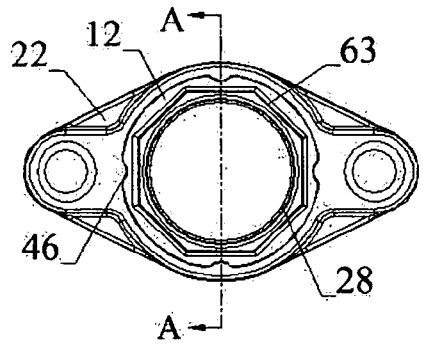
FIG. 9A is a top-down view of a preferred embodiment of the two-piece flange of the present invention.
Figure 9B:
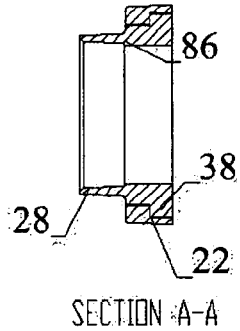
FIG. 9B is a cutaway view of the preferred embodiment shown in FIG. 9A across line A-A.
Figure 9C:
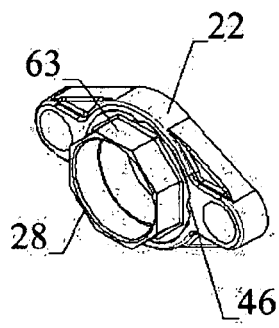
FIG. 9C is a perspective view of the preferred embodiment shown in FIG. 9A.

FIG. 2 and FIG. 7 are very similar but for the reversal of the indentations 14 and protrusions 46. In addition, the indentation 14/protrusion 46 pairings in FIG. 7 are shifted 45° from their positions in FIG. 2. The indentation 14/protrusion 46 pairings may be in any orientation around shoulder piece opening 42/pipe opening 10, so long as they match up.

FIGS. 1-6 include screw 80 to be threaded through base screw hole 82 and shoulder screw hole 84, which are aligned, and preferably run into the indentations 14 and protrusions 46 as shown. It is understood that screw holes 82, 84 do not necessarily have to be through indentations 14 and protrusions 46, but that is preferred. The two-piece flanges shown in FIGS. 7-11 do not include screw 80 and screw holes 82, 84, but it is understood that they could.

Figure 2A:
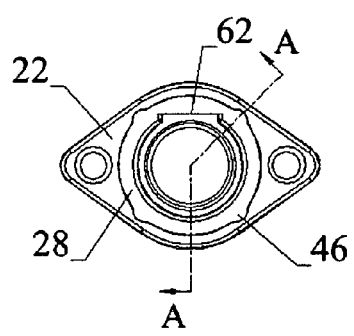
FIG. 2A is a top-down view of a preferred embodiment of the two-piece flange of the present invention.
Figure 2B:
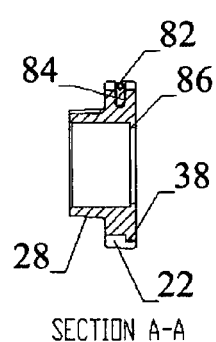
FIG. 2B is a cutaway view of the preferred embodiment shown in FIG. 2A across line A-A.
Figure 2C:
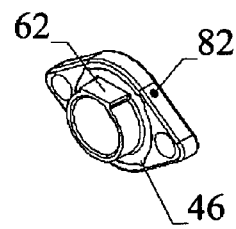
FIG. 2C is a perspective view of the preferred embodiment shown in FIG. 2A.
Figure 2D:
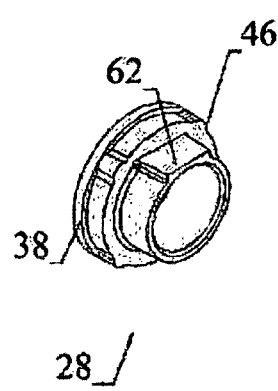
FIG. 2D is a perspective view of the shoulder piece of the preferred embodiment shown in FIG. 2A.
Figure 2E:
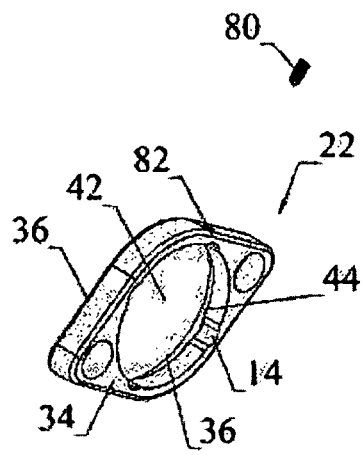
FIG. 2E is a perspective view of the base piece of the preferred embodiment shown in FIG. 2A.
Figure 2F:
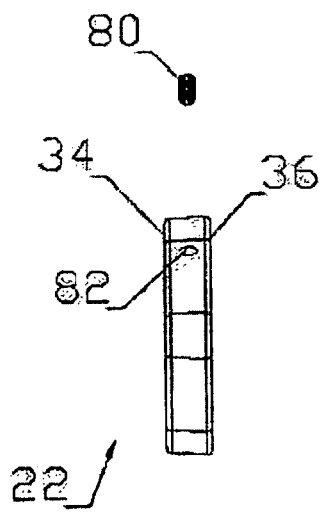
FIG. 2F is a side view of the base piece of the preferred embodiment shown in FIG. 2A.
Figure 2G:
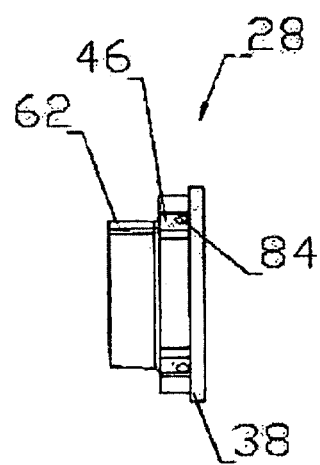
FIG. 2G is a side view of the shoulder piece of the preferred embodiment shown in FIG. 2A.
Figure 3A:
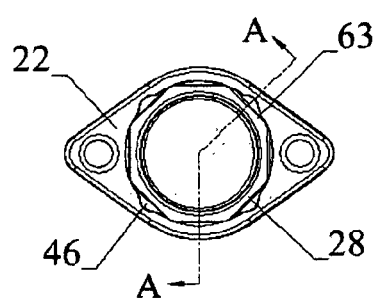
FIG. 3A is a top-down view of a preferred embodiment of the two-piece flange of the present invention.
Figure 3B:
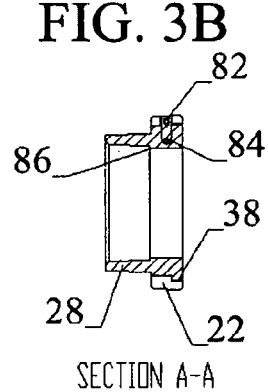
FIG. 3B is a cutaway view of the preferred embodiment shown in FIG. 3A across line A-A.
Figure 3C:
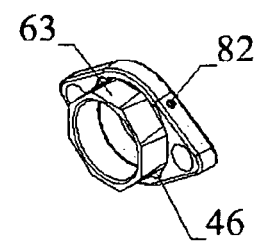
FIG. 3C is a perspective view of the preferred embodiment shown in FIG. 3A.
Figure 3D:
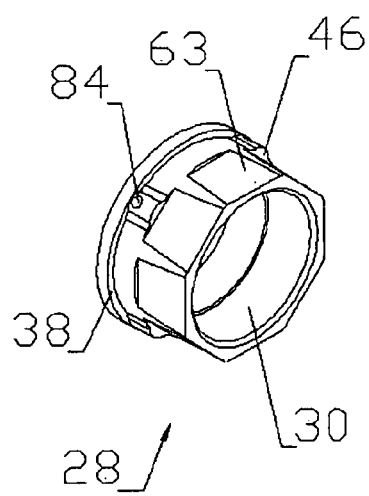
FIG. 3D is a perspective view of the shoulder piece of the preferred embodiment shown in FIG. 3A.
Figure 3E:
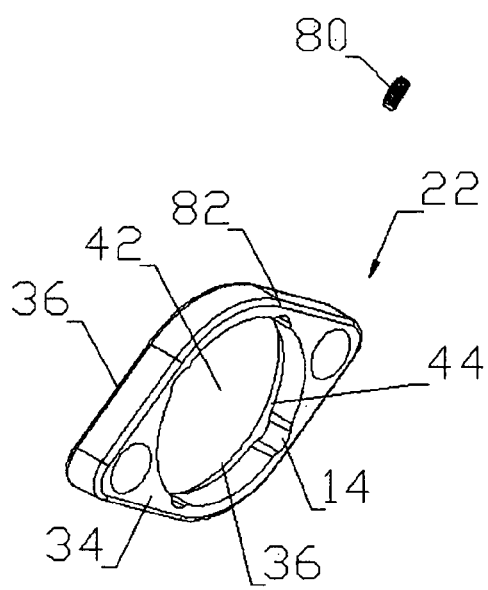
FIG. 3E is a perspective view of the base piece of the preferred embodiment shown in FIG. 3A.
Figure 3F:
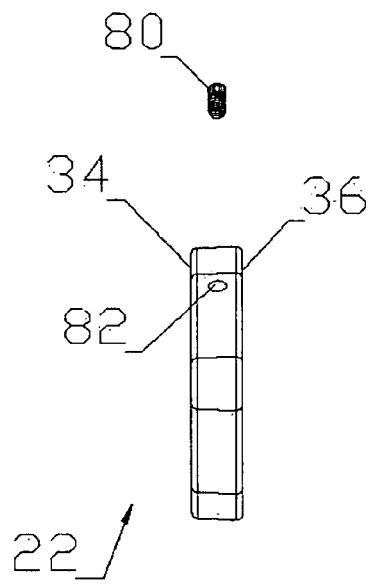
FIG. 3F is a side view of the base piece of the preferred embodiment shown in FIG. 3A.
Figure 3G:
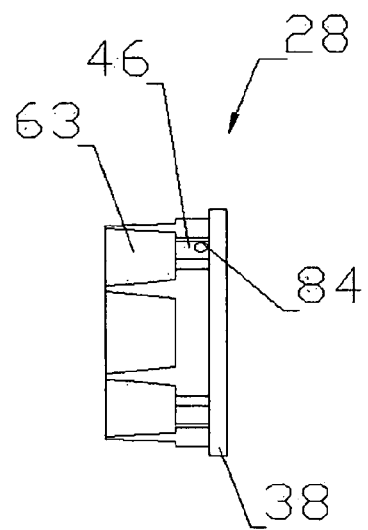
FIG. 3G is a side view of the shoulder piece of the preferred embodiment shown in FIG. 3A.
Figure 4A:
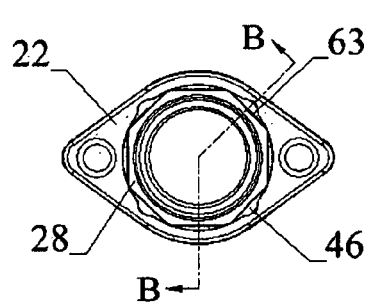
FIG. 4A is a top-down view of a preferred embodiment of the two-piece flange of the present invention.
Figure 4B:
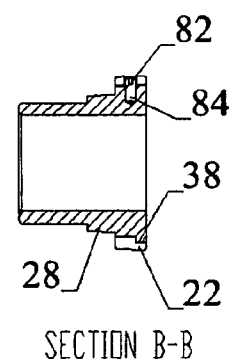
FIG. 4B is a cutaway view of the preferred embodiment shown in FIG. 4A across line A-A.
Figure 4C:
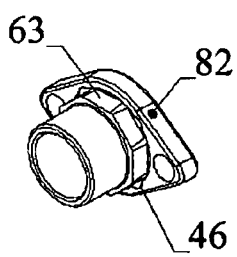
FIG. 4C is a perspective view of the preferred embodiment shown in FIG. 4A.
Figure 4D:
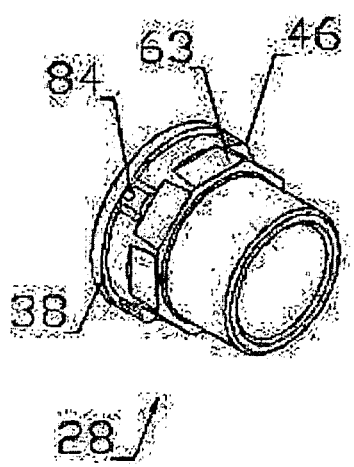
FIG. 4D is a perspective view of the shoulder piece of the preferred embodiment shown in FIG. 4A.
Figure 4E:
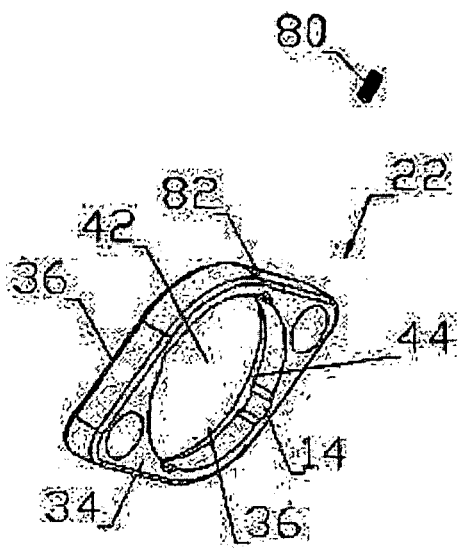
FIG. 4E is a perspective view of the base piece of the preferred embodiment shown in FIG. 4A.
Figure 4F:
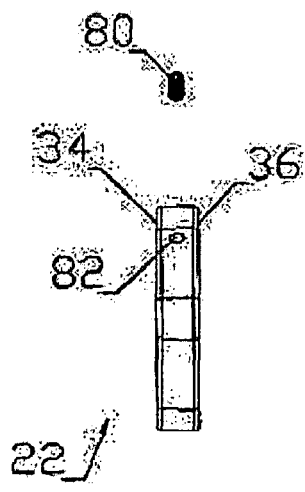
FIG. 4F is a side view of the base piece of the preferred embodiment shown in FIG. 4A.
Figure 4G:
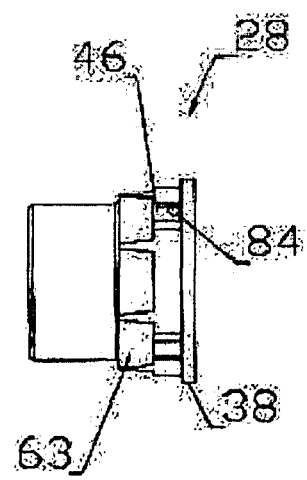
FIG. 4G is a side view of the shoulder piece of the preferred embodiment shown in FIG. 4A.
Figure 5A:
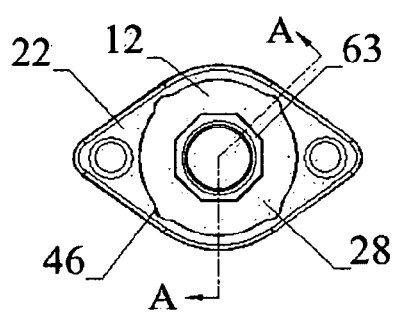
FIG. 5A is a top-down view of a preferred embodiment of the two-piece flange of the present invention.
Figure 5B:
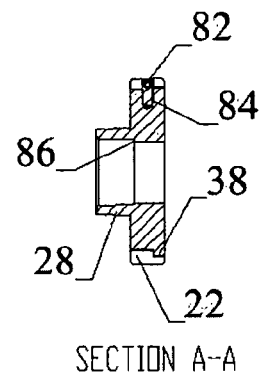
FIG. 5B is a cutaway view of the preferred embodiment shown in FIG. 5A across line A-A.
Figure 5C:
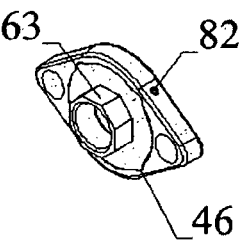
FIG. 5C is a perspective view of the preferred embodiment shown in FIG. 5A.
Figure 5D:
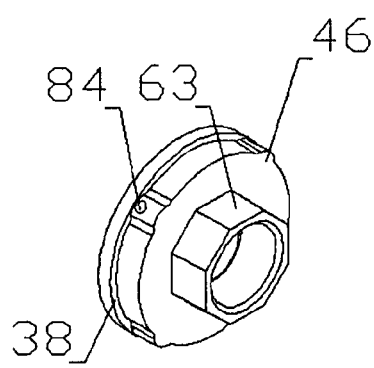
FIG. 5D is a perspective view of the shoulder piece of the preferred embodiment shown in FIG. 5A.
Figure 5E:
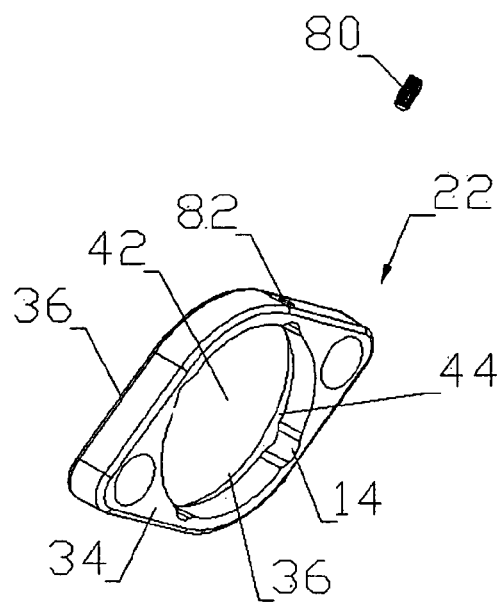
FIG. 5E is a perspective view of the base piece of the preferred embodiment shown in FIG. 5A.
Figure 5F:
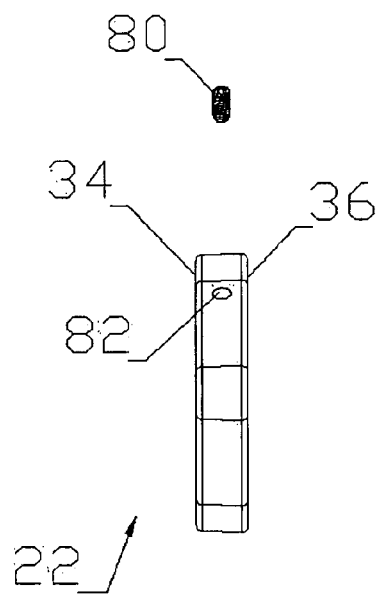
FIG. 5F is a side view of the base piece of the preferred embodiment shown in FIG. 5A.
Figure 5G:
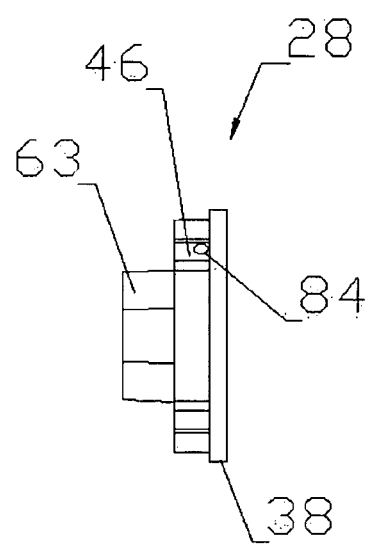
FIG. 5G is a side view of the shoulder piece of the preferred embodiment shown in FIG. 5A.
Figure 6A:
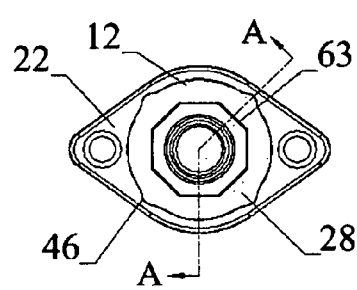
FIG. 6A is a top-down view of a preferred embodiment of the two-piece flange of the present invention.
Figure 6B:
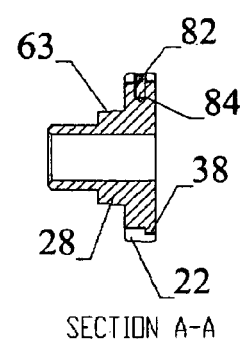
FIG. 6B is a cutaway view of the preferred embodiment shown in FIG. 6A across line A-A.
Figure 6C:
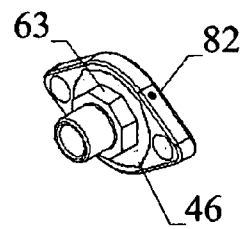
FIG. 6C is a perspective view of the preferred embodiment shown in FIG. 6A.
Figure 6D:
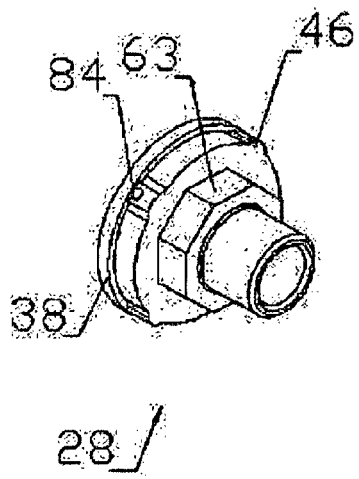
FIG. 6D is a perspective view of the shoulder piece of the preferred embodiment shown in FIG. 6A.
Figure 6E:
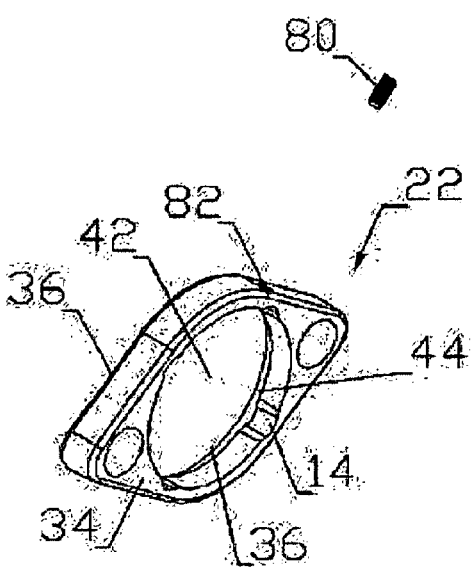
FIG. 6E is a perspective view of the base piece of the preferred embodiment shown in FIG. 6A.
Figure 6F:
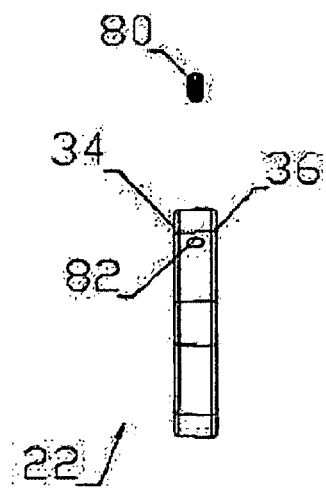
FIG. 6F is a side view of the base piece of the preferred embodiment shown in FIG. 6A.
Figure 6G:
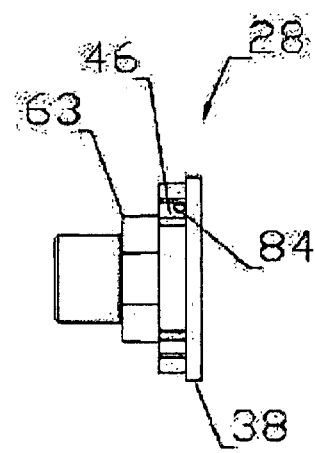
FIG. 6G is a side view of the shoulder piece of the preferred embodiment shown in FIG. 6A.

Each shoulder piece 28 includes a pipe opening 10 with an exterior 18 and an interior 30. Although not shown, it is understood that exterior 18 or interior 30 may be male or female threaded or smooth/sweat all the way or partway up their lengths. The exterior 18 of pipe opening 10 may also include a leveling flat 62, as shown in FIG. 2A. The leveling flat 62 is a flat section on the exterior 18 of the shoulder piece 28 upon which a level may be place to ensure a level installation of the flange resulting in a level circulator and motor and in respect to all adjacent components in a system. FIGS. 1, 14, 16 and 17 are examples of embodiments with smooth exteriors 18 that do not include either leveling flats 62 or gripping surfaces 63. FIGS. 2, 7, 8, and 10 show one leveling flat 62 that extends all the way up exterior 18. In the embodiments of FIGS. 5, 6, 9, 11, and 13, the gripping surfaces 63 that are used to grip and rotate the shoulder piece 28 may also be used in the same manner as the leveling flat 62. The interior 30 of some two-piece flanges, such as those shown in FIGS. 3, 5, and 7-11, include internal step 86. How far internal step 86 travels up the height of interior 30 varies, as is shown.

Each shoulder piece 28 also includes the footing 12 perpendicular to the bottom of the pipe opening 10. The size of the footing 12 will depend on how large the pipe opening 10 is. Compare FIG. 1, for example, with a relatively large footing 12 and a relatively small pipe opening 10, with FIG. 3, for example, with a barely present footing 12 and relatively large pipe opening 10. The shoulder piece 28 also includes a lip 38 below the footing 12, and extending slightly out from the footing 12. This lip 38 catches base piece 22. Base piece 22 includes a corresponding recessed area 44 in which lip 38 rests snugly. Shoulder piece opening 42 is commensurate with outer edge 16 of footing 12 of shoulder piece 28 so that footing 12 nests within shoulder piece opening 42 when shoulder piece 28 and base piece 22 are mated.

Figure 10A:
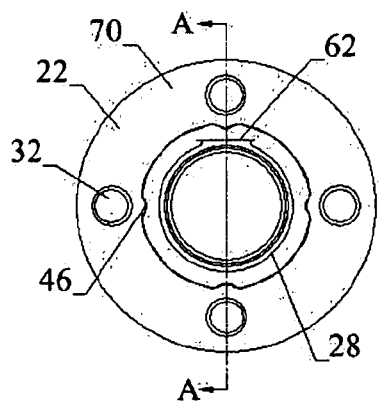
FIG. 10A is a top-down view of a preferred embodiment of the two-piece flange of the present invention.
Figure 10B:
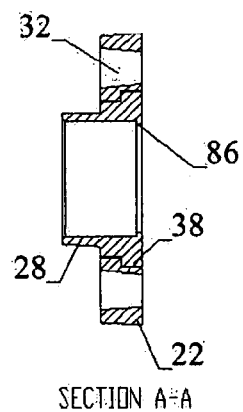
FIG. 10B is a cutaway view of the preferred embodiment shown in FIG. 10A across line A-A.
Figure 10C:
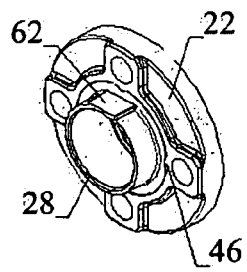
FIG. 10C is a perspective view of the preferred embodiment shown in FIG. 10A.
Figure 11A:
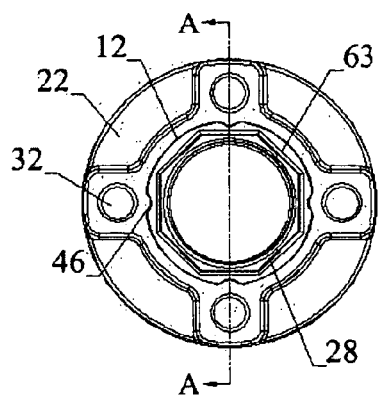
FIG. 11A is a top-down view of a preferred embodiment of the two-piece flange of the present invention.
Figure 11B:
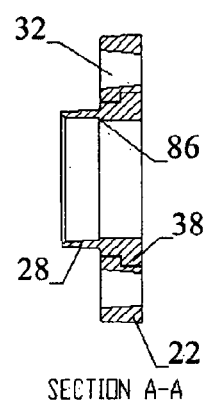
FIG. 11B is a cutaway view of the preferred embodiment shown in FIG. 11A across line A-A.
Figure 11C:
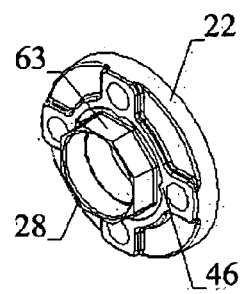
FIG. 11C is a perspective view of the preferred embodiment shown in FIG. 11A.
Figure 12A:
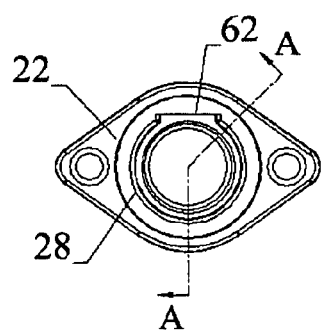
FIG. 12A is a top-down view of a preferred embodiment of the two-piece flange of the present invention.
Figure 12B:
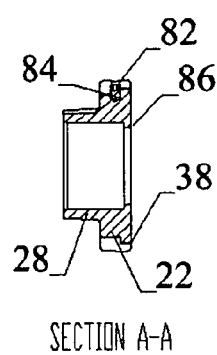
FIG. 12B is a cutaway view of the preferred embodiment shown in FIG. 12A across line A-A.
Figure 12C:
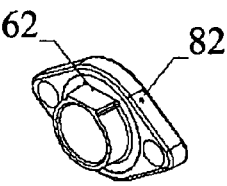
FIG. 12C is a perspective view of the preferred embodiment shown in FIG. 12A.
Figure 12D:
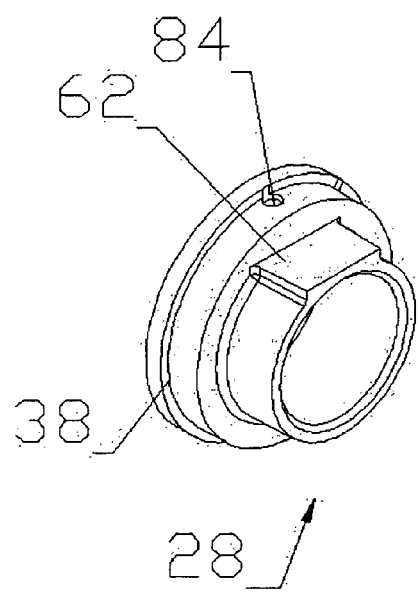
FIG. 12D is a perspective view of the shoulder piece of the preferred embodiment shown in FIG. 12A.
Figure 12E:
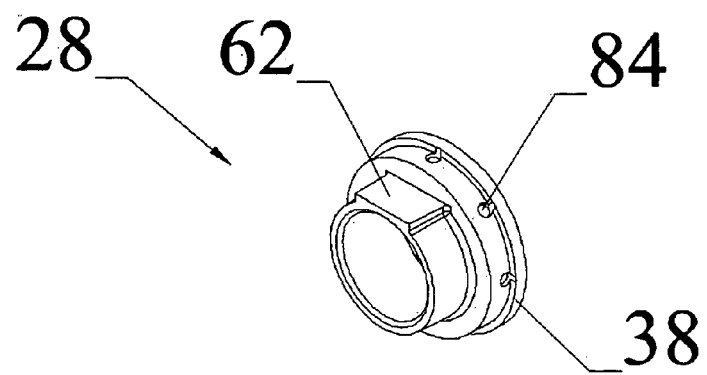
FIG. 12E is an alternate perspective view of the shoulder piece of the preferred embodiment shown in FIG. 12A.
Figure 12F:
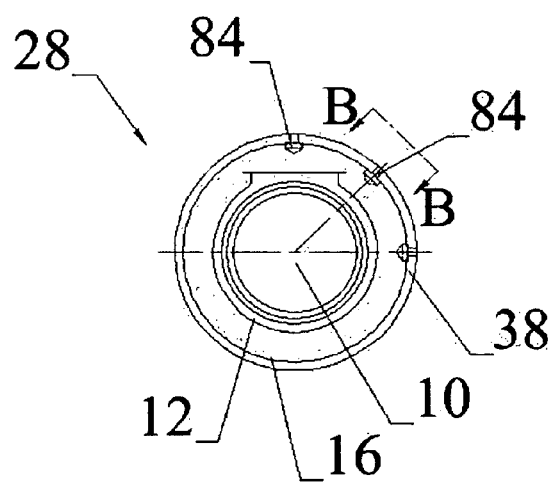
FIG. 12F is a top-down view of the shoulder piece of the preferred embodiment shown in FIG. 12A.
Figure 12G:
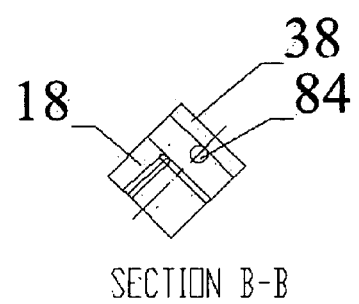
FIG. 12G is a cutaway view of the shoulder piece of the preferred embodiment shown in FIG. 12F across line B-B.
Figure 12H:
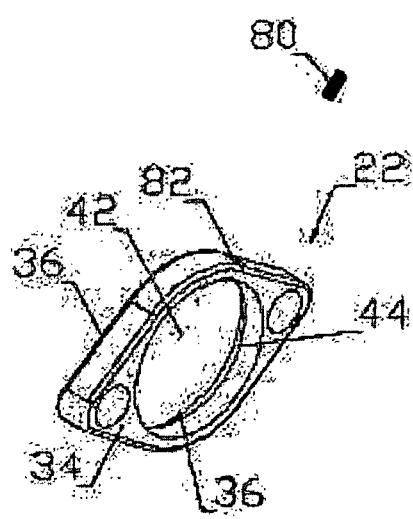
FIG. 12H is a perspective view of the base piece of the preferred embodiment shown in FIG. 12A.
Figure 12I:
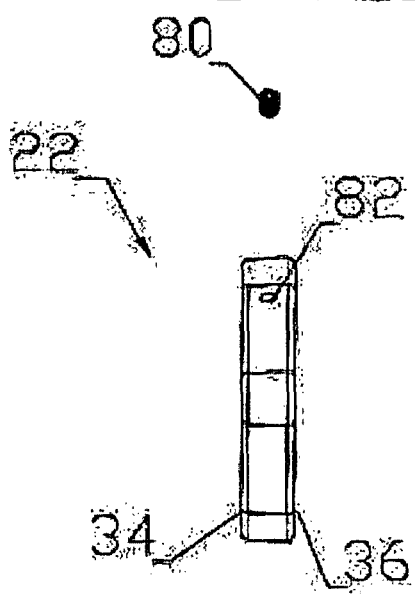
FIG. 12I is a side view of the base piece of the preferred embodiment shown in FIG. 12A.
Figure 12J:
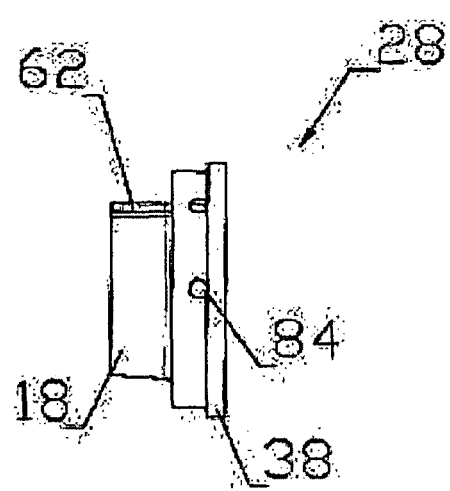
FIG. 12J is a side view of the shoulder piece of the preferred embodiment shown in FIG. 12A.
Figure 13A:
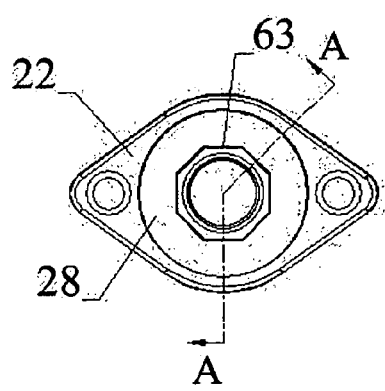
FIG. 13A is a top-down view of a preferred embodiment of the two-piece flange of the present invention.
Figure 13B:
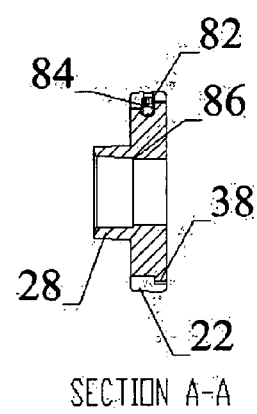
FIG. 13B is a cutaway view of the preferred embodiment shown in FIG. 13A across line A-A.
Figure 13C:
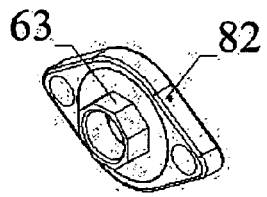
FIG. 13C is a perspective view of the preferred embodiment shown in FIG. 13A.
Figure 13D:
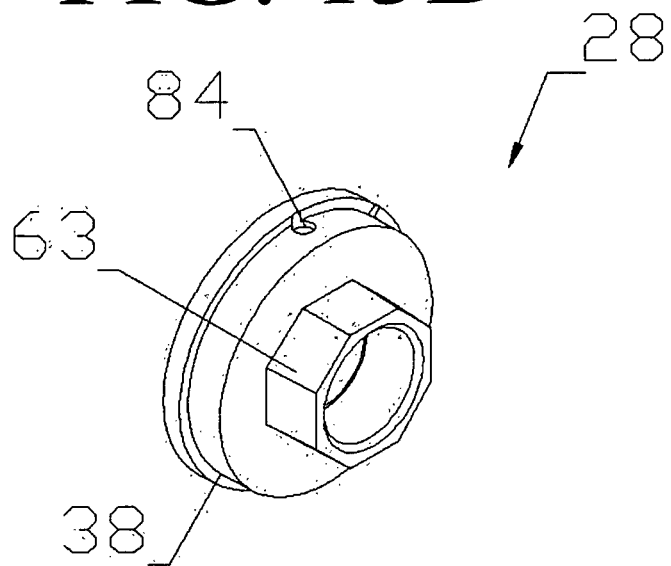
FIG. 13D is a perspective view of the shoulder piece of the preferred embodiment shown in FIG. 13A.
Figure 13E:
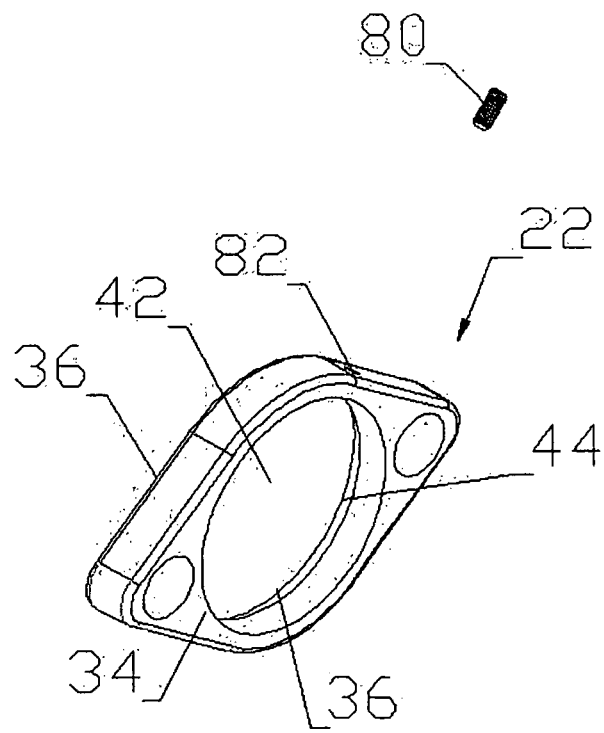
FIG. 13E is a perspective view of the base piece of the preferred embodiment shown in FIG. 13A.
Figure 13F:
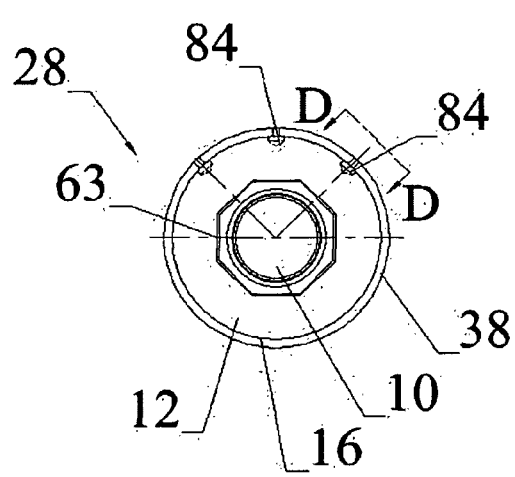
FIG. 13F is a top-down view of the shoulder piece of the preferred embodiment shown in FIG. 13A.
Figure 13G:
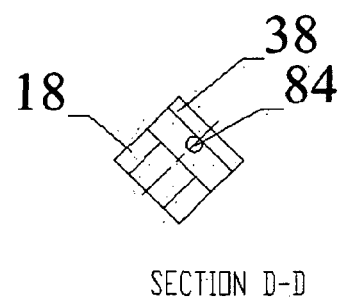
FIG. 13G is a cutaway view of the shoulder piece of the preferred embodiment shown in FIG. 13F across line D-D.
Figure 13H:
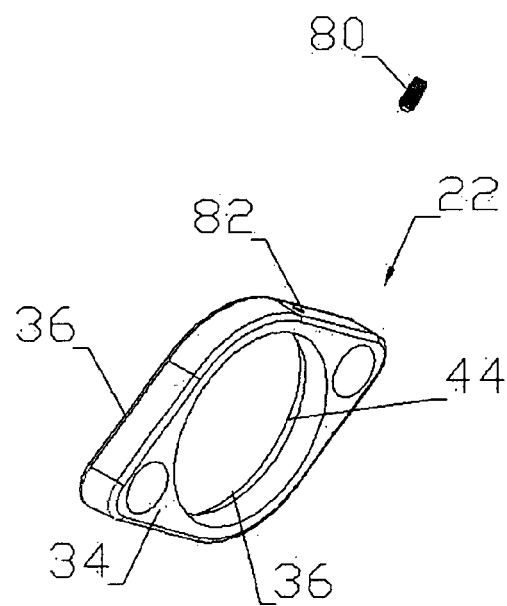
FIG. 13H is a perspective view of the base piece of the preferred embodiment shown in FIG. 13A.
Figure 13I:
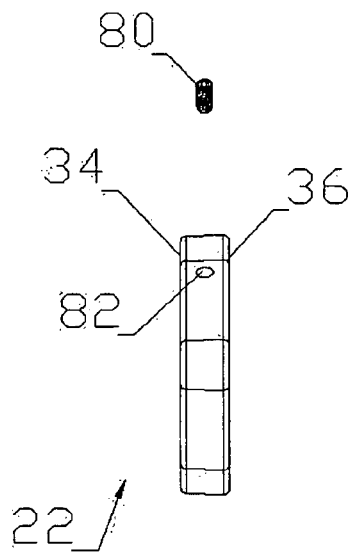
FIG. 13I is a side view of the base piece of the preferred embodiment shown in FIG. 13A.
Figure 13J:
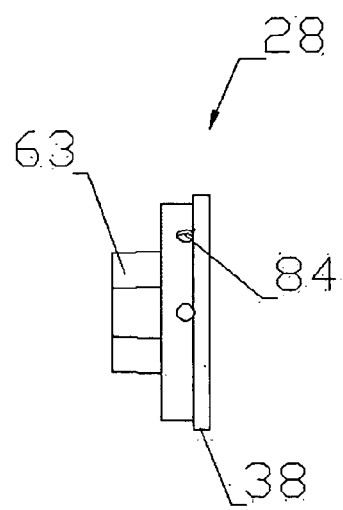
FIG. 13J is a side view of the shoulder piece of the preferred embodiment shown in FIG. 13A.
Figure 13K:
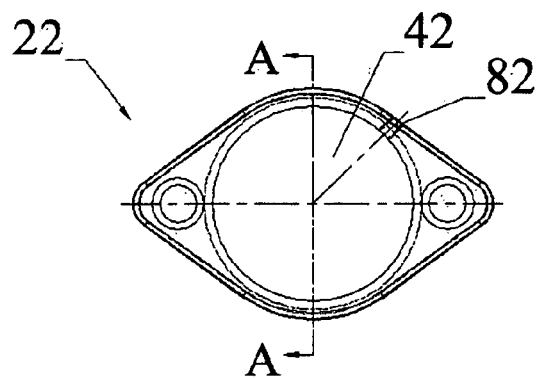
FIG. 13K is a top-down view of the base piece of the preferred embodiment shown in FIG. 13A.
Figure 13L:
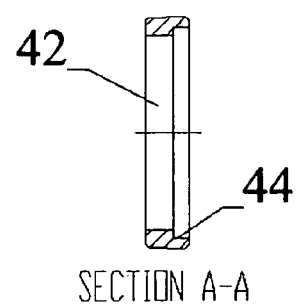
FIG. 13L is cutaway view of the base piece of the preferred embodiment shown in FIG. 13K across line A-A.

Two-piece flanges 20 are preferably either elliptical 72 in shape, as shown in FIGS. 1-9, or circular 70 in shape, as shown in FIGS. 10 and 11. In addition, the top 36 of base piece 22 may be flush, as shown in FIGS. 1-7, or include ridges or other texturing, as shown in the embodiments depicted in FIGS. 8-11. The base pieces 22 of these two-piece flanges 20 are made of cast iron and require the additional thickness for strength. Elliptical 72 two-piece flanges 20 generally have two bolt openings 32. Circular 70 two-piece flanges generally have four bolt openings 32.

FIGS. 12 and 13 show second two-piece flange 20 of the present invention. The second two-piece flange 20 does not include protrusions 46 and indentations 14. Base piece 22 and shoulder piece 28 may still be shifted relative to one another and held in place by a screw 80. All second two-piece flanges 20 therefore require a screw 80, base screw holes 82, and shoulder screw holes 84 to hold two-piece flange 20 in position once the desired relationship between the base piece 22 and the shoulder piece 28 is found. FIG. 12 is very similar to FIG. 2, but for the absence of protrusions 46 and indentations 14. FIG. 13 is very similar to FIG. 5, but for the absence of protrusions 46 and indentations 14.

Now referring to FIG. 14, an embodiment of the first two-piece flange system 100 of the present invention is provided. System 100 includes two two-piece flanges 20 on either side of a circulator 202. Circulator 202 includes circulator volute flanges 206, which attach to the base pieces 22 of the two-piece flanges 20. In this embodiment, gaskets 204 are included between circulator volute flanges 206 and base pieces 22. Mounting bolts 208 and nuts hold circulator 202, gaskets 204, and two-piece flanges 20 firmly together. Shoulder piece 28 is shown being affixed to pipes 210, although it is understood that a coupling or other intermediary component would be necessary between pipe 210 and shoulder piece 28. This is merely exemplary, and it is understood that one or both pipes 210 may be replaced by other components, such as the various ball valves shown in FIGS. 15-19 and discussed below. In this embodiment, however, shoulder pieces 28 are permanently affixed to pipes 210 by soldering, mating threads, or other means during original installation and could incorporate a standard ball or gate valve used as an intermediary connector joining shoulder piece 28 and pipe 210. Should circulator 202 need to replaced, repaired, or shifted for any reason after installation, the installer need only remove the mounting bolts 208 and circulator 202, and shift the base piece 22 of the two-piece flange 20 relative to the shoulder piece 28, while the shoulder pieces 28 and pipes 210 remain affixed and stationary.

Figure 15E:
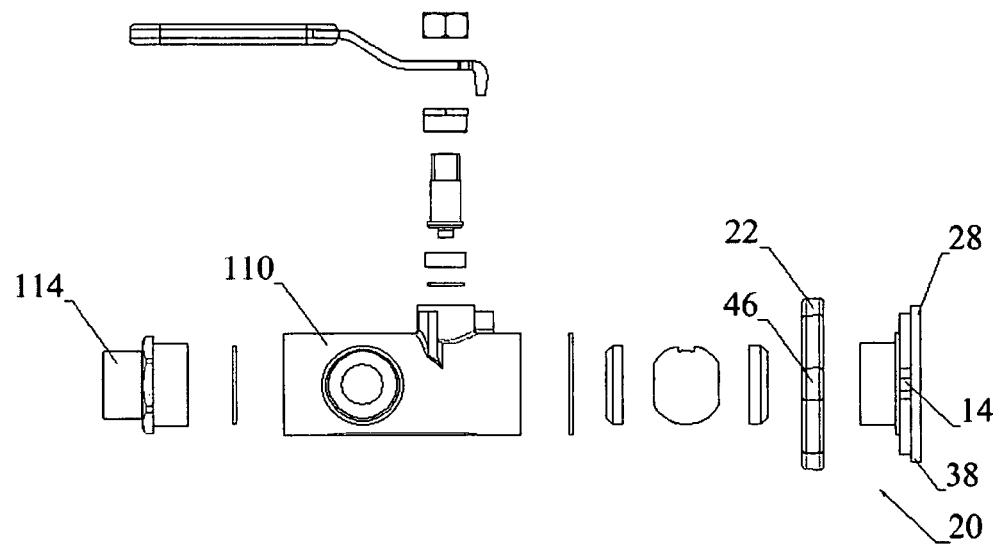
FIG. 15E is a side view of the two-piece flange system shown in FIG. 15A with the system components separated.

Now referring to FIGS. 15A-E, the use of two-piece flange 20 with a ball valve 110 is shown. Ball valve 110 is included in preferred embodiments of system 100, as shown in FIG. 14, where ball valve 110 would replace one or both of pipes 210 or a standard valve or valves. System 100 includes two-piece flange 20, a ball valve 110 with union purge connector, and a sweat retainer 114. In some embodiments, the ball valve with union purge connector is substituted by a standard boiler drain purge. FIG. 15A shows a side view of a ¾" r two-piece flange 20 in use with a ¾" ball valve 110 with union purge and ¾" sweat retainer 114. Reference to a dimension of a two-piece flange 20, such as "¾" two-piece flange 20," is referring to the diameter of pipe opening 10 of shoulder piece 28. Although ¾" and 1" refer to standard pipe outside diameters, and are depicted in FIGS. 15-19, it is understood that systems of the present invention including two-piece flange 20 may be used with all standard pipe diameters, and may be customized for non-standard diameters. FIG. 15B shows a perspective view of the same. FIG. 15C shows a cutaway view of the same along line A-A, shown in FIG. 15A. This view shows the various components of this part of system 100, including ball valve 110 with union purge and sweat retainer 114, and the components of two-piece flange 20. Specifically, base piece 22 is visible on either side of shoulder piece 28 with lip 38. FIG. 15C also shows that the total height of two-piece flange 20 in combination with ball valve 110 is 5". FIG. 15D shows a perspective view of the various components separated. Here, we see protrusions 46 on base piece 22 and indentations 14 on shoulder piece 28 of two-piece flange 20. Finally, FIG. 15E is a side view of the components shown in FIG. 15D.

Figure 16A:
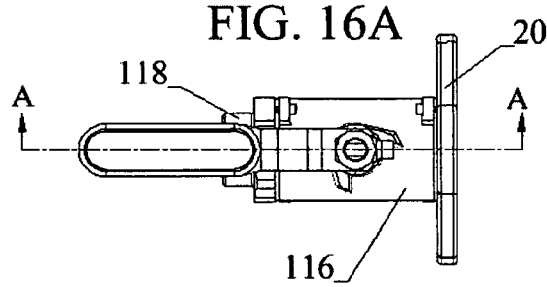
FIG. 16A is a side view of a two-piece flange system of the present invention.
Figure 16B:
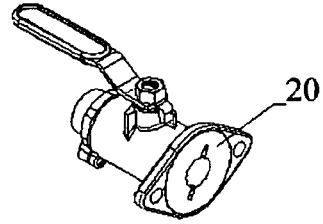
FIG. 16B is a perspective view of the two-piece flange system shown in FIG. 16A.
Figure 16C:
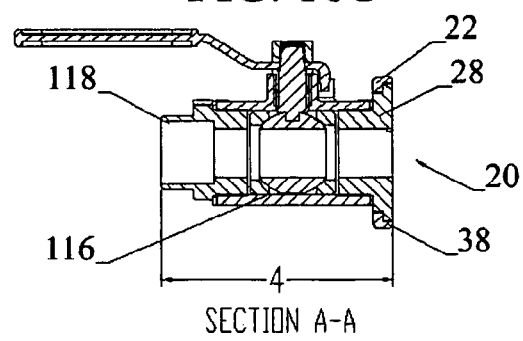
FIG. 16C is a cutaway view of the two-piece flange system shown in FIG. 16A across line A-A.
Figure 16D:
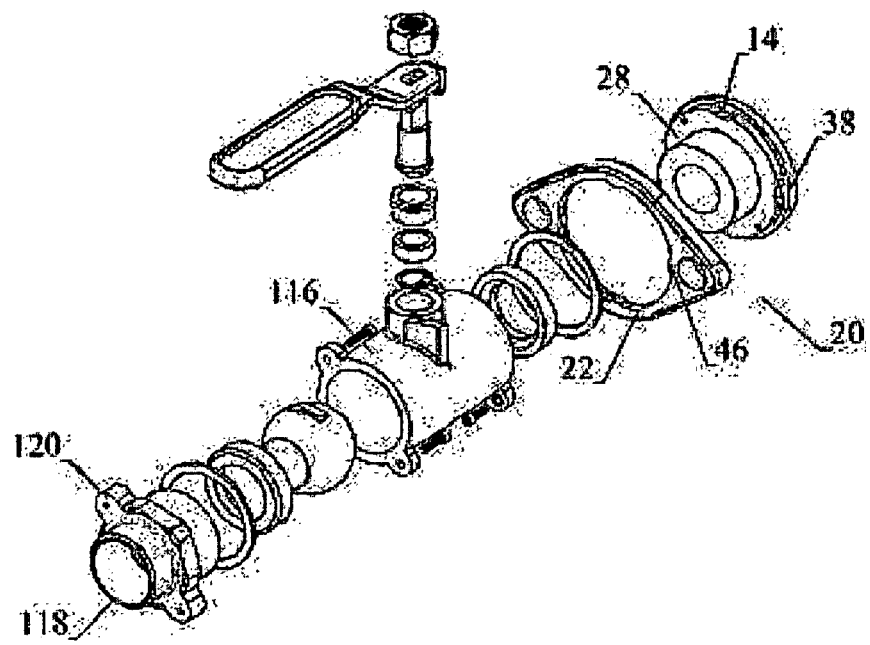
FIG. 16D is a perspective view of the two-piece flange system shown in FIG. 16A with the system components separated.
Figure 16E:
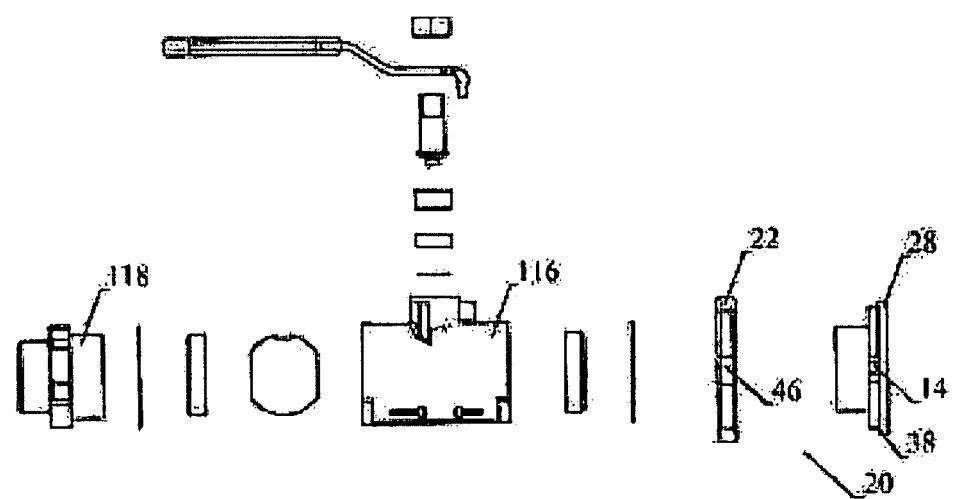
FIG. 16E is a side view of the two-piece flange system shown in FIG. 16A with the system components separated.

Now referring to FIGS. 16A-E, two-piece flange 20 is shown in combination with a threaded ball valve 116 with no retainer stop wall, and a sweat retainer 118 with tabs 120, most clearly visible in FIG. 16D. Ball valve 116 is sweat with regards to sweat retainer 118 and threaded on the opposite end to mate with shoulder piece 28 of two-piece flange 20. FIG. 16A shows a side view of a 1" two-piece flange 20 in use with a 1" threaded ball valve 116 with no stop wall and 1" sweat retainer 118 with tabs 120. FIG. 16B shows a perspective view of the same. FIG. 16C shows a cutaway view of the same along line A-A, shown in FIG. 16A. This view shows threaded ball valve 116, sweat retainer 118, and the components of two-piece flange 20. Base piece 22 is visible on either side of shoulder piece 28 with lip 38. FIG. 16C also shows that the total height of two-piece flange 20 in combination with ball valve 116 is 4". FIG. 16D shows a perspective view of the various components separated. Here, we see protrusions 46 on base piece 22 and indentations 14 on shoulder piece 28 of two-piece flange 20. Finally, FIG. 16E is a side view of the components shown in FIG. 16D.

Figure 17A:
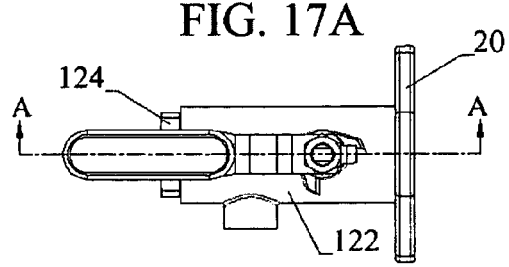
FIG. 17A is a side view of a two-piece flange system of the present invention.
Figure 17B:
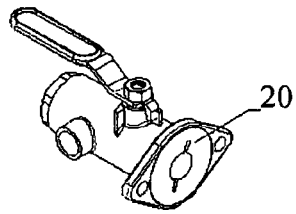
FIG. 17B is a perspective view of the two-piece flange system shown in FIG. 17A.
Figure 17C:
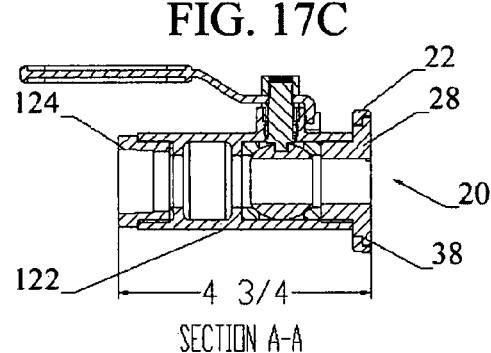
FIG. 17C is a cutaway view of the two-piece flange system shown in FIG. 17A across line A-A.

Now referring to FIGS. 17A-C, two-piece flange 20 is shown in combination with a threaded ball valve 122 with purge, and a National Pipe Thread-Female (NPTF) retainer 124. FIG. 17A shows a side view of a 1" two-piece flange 20 in use with a 1" threaded ball valve 122 with ½" NPTF purge connection port and 1" NPTF retainer 124. FIG. 17B shows a perspective view of the same. FIG. 17C shows a cutaway view of the same along line A-A, shown in FIG. 17A. This view shows the various components, including threaded ball valve 122, NPTF retainer 124, and the components of two-piece flange 20. Base piece 22 is visible on either side of shoulder piece 28 with lip 38. FIG. 17C also shows that the total height two-piece flange 20 in combination with ball valve 122 is 4.75".

Figure 18A:
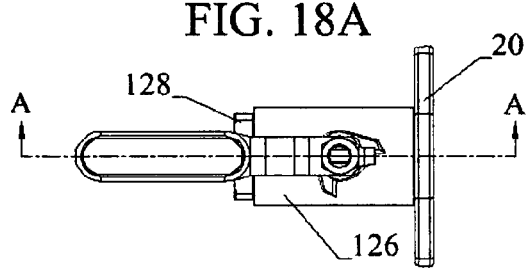
FIG. 18A is a side view of a two-piece flange system of the present invention.
Figure 18B:
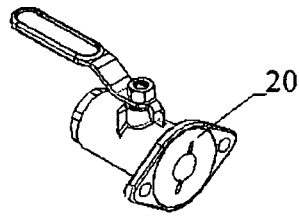
FIG. 18B is a perspective view of the two-piece flange system shown in FIG. 18A.
Figure 18C:
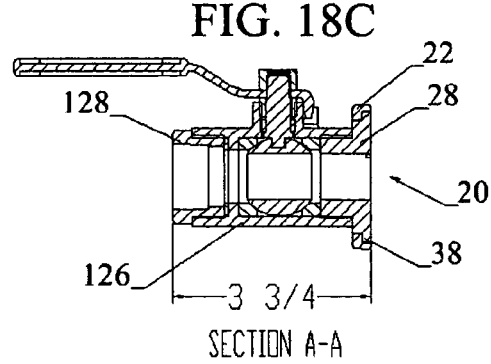
FIG. 18C is a cutaway view of the two-piece flange system shown in FIG. 18A across line A-A.

Now referring to FIGS. 18A-C, two-piece flange 20 is shown in combination with a threaded ball valve 126, and an NPTF retainer 128. FIG. 18A shows a side view of a 1" two-piece flange 20 in use with a 1" threaded ball valve 126 and 1" NPTF retainer 128. FIG. 18B shows a perspective view of the same. FIG. 18C shows a cutaway view of the same along line A-A, shown in FIG. 18A. This view shows the various components, including the components of two-piece flange 20. Base piece 22 is visible on either side of shoulder piece 28 with lip 38. FIG. 18C also shows that the total height of two-piece flange 20 in combination with ball valve 126 is 3.75", which differs from the combination shown in FIGS. 17A-17C only in that ball valve 126 lacks a purge port.

Figure 19A:
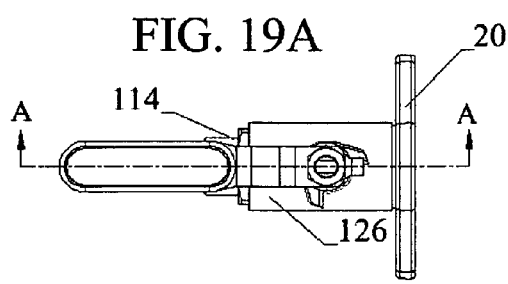
FIG. 19A is a side view of a two-piece flange system of the present invention.
Figure 19B:
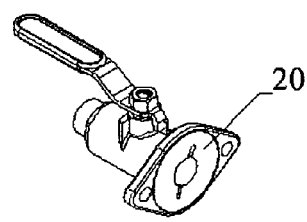
FIG. 19B is a perspective view of the two-piece flange system shown in FIG. 19A.
Figure 19C:
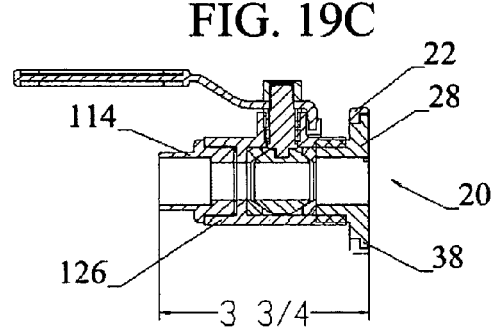
FIG. 19C is a cutaway view of the two-piece flange system shown in FIG. 19A across line A-A.

Now referring to FIGS. 19A-C, two-piece flange 20 is shown in combination with a threaded ball valve 126, and a sweat retainer 114. FIG. 19A shows a side view of a ¾" two-piece flange 20 in use with a ¾" ball valve 126 and ¾" sweat retainer 114. FIG. 19B shows a perspective view of the same. FIG. 19C shows a cutaway view of the same along line A-A, shown in FIG. 19A. This view shows the various components, including the components of two-piece flange 20. Base piece 22 is visible on either side of shoulder piece 28 with lip 38. FIG. 19C also shows that the total height of two-piece flange 20 in combination with ball valve 126 is 3.75".

The combinations shown in FIGS. 15-19 are understood to be exemplary and do not represent the full range of possible combinations of the present invention. They display various combinations of different types of valves and retainers in use with two-piece flange 20. Other types of valves and retainers not shown in these FIGS. may also be included or substituted. One of ordinary skill in the art will recognize that there are many combinations of common components that may be combined into a system with the two-piece flange 20 of the present invention.

Figure 20A:
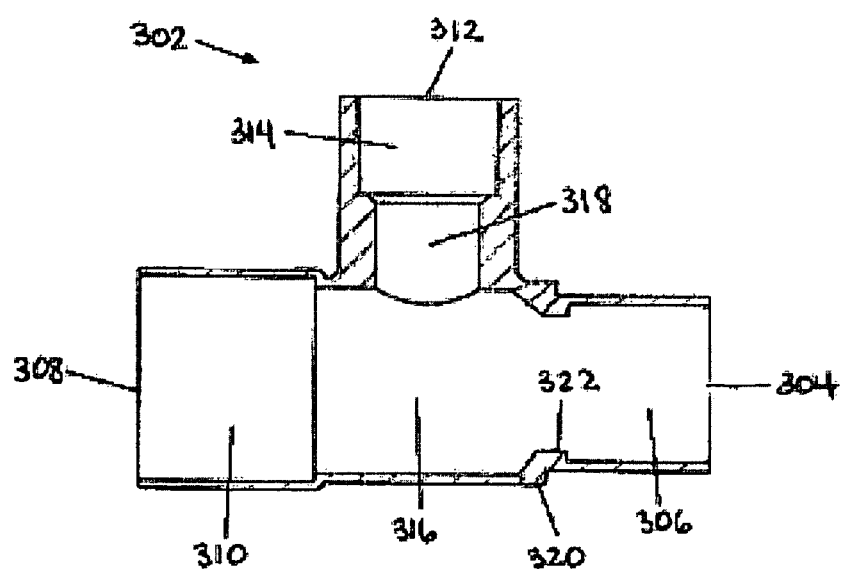
FIG. 20A is a cut away side view of a street accessory tee fitting of the second two-piece flange system of the present invention.
Figure 20B:
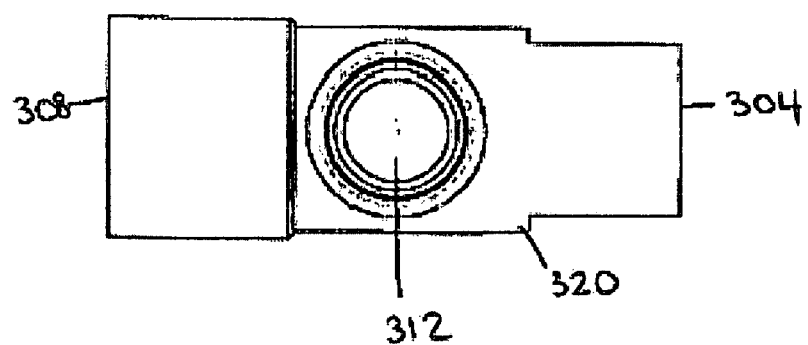
FIG. 20B is a top view of the street accessory tee fitting of FIG. 20A.
Figure 20C:
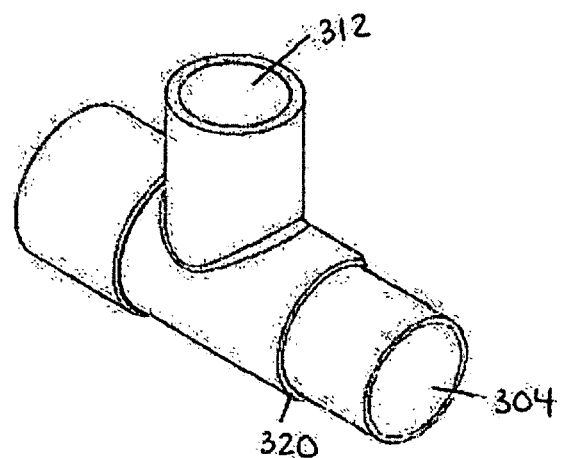
FIG. 20C is an isometric view of the street accessory tee fitting of FIGS. 20A and 20B.

Referring now to FIGS. 20A-20C, one embodiment of a male street accessory tee fitting 302 of the second two-piece flange system of the present invention is shown. The second two-piece flange system of the present invention includes at least two-piece flange 20 and male street accessory tee fitting 302.

The male street accessory tee fitting 302 includes first tee opening 304 with first body 306, second tee opening 308 with second body 310, third tee opening 312 with third body 314, first run 316 between first and second tee openings 304, 308, and second branch 318. Second branch 318 is connected to first run 316 at an angle, preferably a right angle as shown. The inside of second body 310 may require machining depending on that with which it is mated. Machining would be required for second body 310 to mate with a standard copper pipe, for example.

In the embodiment shown, first body 306 is a round male street body that includes external step 320 and internal stop 322. The external step 320 has a slightly wider diameter than the rest of the body 306. The external step 320 may be of any length so that there is sufficient space between the top of the external step 320 and the end of an accessory being connected to the male street body 306 so that solder may flow into the joint. Sufficient space is enough to accept the diameter of the solder to be inserted. The inclusion of an internal stop 322 is for those instances when the male street body 304 is used as a female sweat body. The inclusion of internal stop 322 is not necessarily preferred and may be excluded. The internal stop 322 provides an affirmative stop for male pipes or accessories being coupled with the body 304, and also prevents solder from leaking through the body 304 beyond where it is needed.

First tee opening 304 is sized so as to fit within a standard-sized pipe fitting hub. Second body 310 and second tee opening 308 form a standard-sized pipe hub that fits with a standard pipe. Third body 314 is adapted to mate with a specific accessory and may take a number of forms. For example, it may include internal threading so as to mate with threading on a boiler drain valve, temperature gauge or other accessory. It is understood that the threading on third body 314 and the threaded accessory may be reversed so that third body 314 is male and includes external threading, and the accessory is female and includes internal threading.

Although not shown, one of ordinary skill in the art will understand that the shoulder piece 28 of two-piece flange 20 may be mated with any of the first, second, and third bodies 306, 310, 314, depending on the characteristics of the interior 30 and exterior 18 of pipe opening 10 of shoulder piece 28 and the characteristics of the bodies 306, 310, 314. The second system of the present invention may also include one or more ball valves as shown in FIGS. 15-19. The second system of the present invention may also include a boiler drain fitting (not shown) or a circulator 202, as shown in FIG. 14.

It is understood that the positions of first, second, and third bodies 306, 310, and 314 may be in any positions on accessory tee fitting 302, and are not necessarily placed where shown in FIGS. 20A-20C. Moreover, it is understood that only first body 306, which is a round male street body, with external step 320 is a necessary aspect for accessory tee fitting 302. Second and third bodies 310, 314 may be any combination of a standard fitting, male or female threaded fitting, male sweat, barbed PEX fitting, solder-less connection, union threaded, etc.

Figure 21:
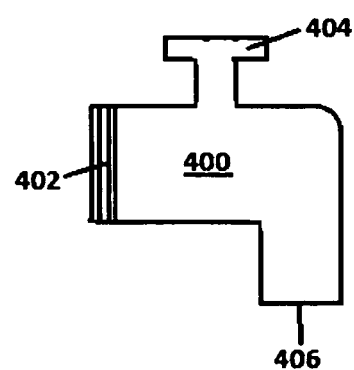
FIG. 21 is a view of a tap fitting.

Now referring to FIG. 21, a view of tap fitting 400 is provided. Tap fitting 400 is a fitting in the shape of a tap. Tap fitting 400 includes at least a fitting end 402, a spout 404, and a valve handle 406. Tap fitting 400, as shown, includes a threaded fitting end 402. It is understood, however, that this threaded fitting end 402 is merely exemplary, and fitting end 402 may include attachment fitting means including a standard fitting, male or female threaded fitting, male sweat, barbed PEX fitting, solder-less connection, union threaded, etc. Valve handle 406 controls whether liquid is allowed to pour out of spout 404. Tap fitting 400 may be used in conjunction with accessory tee fitting 302, as described above.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

The invention claimed is:

1. A two-piece flange for use in heating, plumbing, and air-conditioning systems comprising:
   a screw;
   a base piece comprising:
      a top;
      a bottom;
      a shoulder piece opening extending through said top and said bottom;
      a recessed portion surrounding said shoulder piece opening and extending partway between said top and said bottom of said base piece, such that said bottom of said base piece is smaller in area than said top of said base piece; and
      at least one base screw hole drilled parallel to and between said top and said bottom and above said recessed portion, wherein said at least one base screw hole is of a size to accept said screw; and
   a shoulder piece comprising:
      a circular footing sized and dimensioned to fit snugly within said shoulder piece opening of said base piece, comprising an outer edge;
      a lip sized and dimensioned to fit snugly within said recessed portion of said base piece and designed to catch said base piece so that said shoulder piece is held within said shoulder portion of said base piece;
      at least two shoulder screw holes drilled parallel to said footing and above said lip, wherein said at least two shoulder screw holes are of a size to accept said screw;
      a circular pipe opening extending upward and perpendicularly away from said footing; and
      an exterior and an interior surrounding said pipe opening;
      at least two indentations cut away from one of a group consisting of said outer edge of said footing of said shoulder piece and said top of said shoulder piece opening of said base piece;
      at least one protrusion protruding from one of a group consisting of said outer edge of said footing of said shoulder piece and said top of said shoulder piece opening of said base piece;
      wherein:
         if said at least two indentations are cut away from said outer edge of said footing of said shoulder piece, then said at least one protrusion protrudes from said top of said shoulder piece opening of said base piece and wherein if said at least two indentations are cut away from said top of said shoulder piece opening of said base piece, then said at least one protrusion protrudes from said outer edge of said footing of said shoulder piece;
         said at least one protrusion and said at least two indentations are sized and dimensioned to mate with one another such that said base piece and said shoulder piece are held in place with respect to one another when said at least one protrusion and at least one of said at least two indentations are mated, but such that said base piece and said shoulder piece are adjustable into at least two positions by moving said shoulder piece within said shoulder piece; and
         said at least two shoulder screw holes and said at least one base screw hole are positioned within said shoulder piece and said base piece, respectively, such that said at least one base screw hole is able to align with each of said at least two shoulder screw holes by moving said shoulder piece and said base piece relative to one another, such that said screw is able to penetrate through said at least one base screw hole and said one of said at least two shoulder screw holes with which said at least one base screw hole is aligned.

2. The two-piece flange as claimed in claim 1, wherein said exterior of said pipe opening of said shoulder piece comprises one of a group consisting of at least one gripping surface extending up a full height of said exterior; at least one gripping surface extending up part of a full height of said exterior; and a leveling flat.

3. The two-piece flange as claimed in claim 1, wherein threading is comprised by one of a group consisting of said exterior of said pipe opening of said shoulder piece; said interior of said pipe opening of said shoulder piece; and said interior and said exterior of said pipe opening of said shoulder piece.

4. The two-piece flange as claimed in claim 1, wherein said interior of said pipe opening of said shoulder piece comprises an internal step.

5. The two-piece flange as claimed in claim 1, wherein said at least one protrusion is four evenly spaced protrusions and said at least two indentations are four evenly spaced indentations.

6. The two-piece flange as claimed in claim 1, wherein said at least one protrusion is at least two protrusions and:
   when said at least one protrusion protrudes from said outer edge of said footing of said shoulder piece, at least one of said at least two shoulder screw holes is drilled into at least one of said at least one protrusions and said at least one base screw hole is drilled through at least one of said at least two indentations in said shoulder piece opening of said base piece; and
   when said at least one protrusion protrudes from said top of said shoulder piece opening of said base piece, said at least one base screw hole is drilled through at least one of said at least one protrusion and at least one of said at least two shoulder screw holes are drilled into at least one of said at least two indentations in said outer edge of said footing of said shoulder piece.

7. The two-piece flange as claimed in claim 1, wherein said at least one base screw hole is one base screw hole and said at least two shoulder screw holes are three shoulder screw holes.

8. A two-piece flange system, comprising:
at least one two-piece flange comprising:
  a screw;
  a base piece comprising:
    a top;
    a bottom;
    a shoulder piece opening extending through said top and said bottom;
    a recessed portion surrounding said shoulder piece opening and extending partway between said top and said bottom of said base piece, such that said bottom of said base piece is smaller in area than said top of said base piece; and
    at least one base screw hole drilled parallel to and between said top and said bottom of said base piece and above said recessed portion of said base piece, wherein said at least one base screw hole is of a size to accept said screw; and
  a shoulder piece comprising:
    a circular footing sized and dimensioned to fit snugly within said shoulder piece opening of said base piece, comprising an outer edge;
    a lip sized and dimensioned to fit snugly within said recessed portion of said base piece and designed to catch said base piece so that said shoulder piece is held within said shoulder portion of said base piece;
    a circular pipe opening extending upward and perpendicularly away from said footing;
    an exterior and an interior surrounding said pipe opening; and
    at least two shoulder screw holes drilled parallel to said footing of said shoulder piece and above said lip of said shoulder piece, wherein said at least two shoulder screw holes are of a size to accept said screw;
    wherein said at least two shoulder screw holes and said at least one base screw hole are positioned within said shoulder piece and said base piece, respectively, such that said at least one base screw hole is able to align with each of said at least two shoulder screw holes by moving said base piece relative to said shoulder piece, such that said screw is able to penetrate through said at least one base screw hole and said one of said at least two shoulder screw holes with which said at least one base screw hole is aligned; and
  a circulator comprising a circulator volute flange on either side of said circulator, wherein said circulator volute flange is attachable to said base piece of said at least one-two-piece flange.

9. The two-piece valve system as claimed in claim 8, further comprising at least one ball valve attachable to said shoulder piece of said at least one two-piece flange.

10. The two-piece valve system as claimed in claim 8, wherein said two-piece flange further comprises:

at least two indentations cut away from one of a group consisting of said outer edge of said footing of said shoulder piece and said top of said shoulder piece opening of said base piece;
at least one protrusion protruding from one of a group consisting of said outer edge of said footing of said shoulder piece and said top of said shoulder piece opening of said base piece;
wherein if said at least two indentations are cut away from said outer edge of said footing of said shoulder piece, then said at least one protrusion protrudes from said top of said shoulder piece opening of said base piece and wherein if said at least two indentations are cut away from said top of said shoulder piece opening of said base piece, then said at least one protrusion protrudes from said outer edge of said footing of said shoulder piece; and
wherein said at least one protrusion and said at least two indentations are sized and dimensioned to mate with one another such that said base piece and said shoulder piece are held in place with respect to one another when said at least one protrusion and at least one of said at least two indentations are mated, but such that said base piece and said shoulder piece are adjustable into at least two positions by moving said base piece relative to said shoulder piece.

11. A two-piece flange system, comprising:
at least one two-piece flange comprising:
  a base piece comprising:
    a top;
    a bottom;
    a shoulder piece opening extending through said top and said bottom; and
    a recessed portion surrounding said shoulder piece opening and extending partway between said top and said bottom of said base piece, such that said bottom of said base piece is smaller in area than said top of said base piece;
  a shoulder piece comprising:
    a circular footing sized and dimensioned to fit snugly within said shoulder piece opening of said base piece, comprising an outer edge;
    a lip sized and dimensioned to fit snugly within said recessed portion of said base piece and designed to catch said base piece so that said shoulder piece is held within said shoulder portion of said base piece;
    a circular pipe opening extending upward and perpendicularly away from said footing; and
    an exterior and an interior surrounding said pipe opening;
  at least two indentations cut away from one of a group consisting of said outer edge of said footing of said shoulder piece and said top of said shoulder piece opening of said base piece;
  at least one protrusion protruding from one of a group consisting of said outer edge of said footing of said shoulder piece and said top of said shoulder piece opening of said base piece;
  wherein if said at least two indentations are cut away from said outer edge of said footing of said shoulder piece, then said at least one protrusion protrudes from said top of said shoulder piece opening of said base piece and wherein if said at least two indentations are cut away from said top of said shoulder piece opening of said base piece, then said at least one protrusion protrudes from said outer edge of said footing of said shoulder piece; and wherein said at least one protrusion and said at least two indentations are sized and dimensioned to mate with one another such that said base piece and said shoulder piece are held in place with respect to one another when said at least one protrusion and at least one of said at least two indentations are mated, but such that said base piece and said shoulder piece are adjustable into at least two positions by moving said base piece relative to said shoulder piece; and a circulator comprising a circulator volute flange on either side of said circulator, wherein said circulator volute flange is attachable to said base piece of said at least one two-piece flange.

12. The two-piece valve system as claimed in claim 11, further comprising at least one ball valve attachable to said shoulder piece of said at least one two-piece flange.

13. A two-piece flange system, comprising:

at least one two-piece flange comprising:

a screw;

a base piece comprising:

a top;

a bottom;

a shoulder piece opening extending through said top and said bottom;

a recessed portion surrounding said shoulder piece opening and extending partway between said top and said bottom of said base piece, such that said bottom of said base piece is smaller in area than said top of said base piece; and at least one base screw hole drilled parallel to and between said top and said bottom of said base piece and above said recessed portion of said base piece, wherein said at least one base screw hole is of a size to accept said screw; and a shoulder piece comprising:

a circular footing sized and dimensioned to fit snugly within said shoulder piece opening of said base piece, comprising an outer edge;

a lip sized and dimensioned to fit snugly within said recessed portion of said base piece and designed to catch said base piece so that said shoulder piece is held within said shoulder portion of said base piece;

a circular pipe opening extending upward and perpendicularly away from said footing;

an exterior and an interior surrounding said pipe opening;

at least two shoulder screw holes drilled parallel to said footing of said shoulder piece and above said lip of said shoulder piece, wherein said at least two shoulder screw holes are of a size to accept said screw;

wherein said at least two shoulder screw holes and said at least one base screw hole are positioned within said shoulder piece and said base piece, respectively, such that said at least one base screw hole is able to align with each of said at least two shoulder screw holes by moving said base piece and said shoulder piece relative, such that said screw is able to penetrate through said at least one base screw hole and into said one of said at least two shoulder screw holes with which said at least one base screw hole is aligned;

at least two indentations cut away from one of a group consisting of said outer edge of said footing of said shoulder piece and said top of said shoulder piece opening of said base piece;

at least one protrusion protruding from one of a group consisting of said outer edge of said footing of said shoulder piece and said top of said shoulder piece opening of said base piece;

wherein if said at least two indentations are cut away from said outer edge of said footing of said shoulder piece, then said at least one protrusion protrudes from said top of said shoulder piece opening of said base piece and wherein if said at least two indentations are cut away from said top of said shoulder piece opening of said base piece, then said at least one protrusion protrudes from said outer edge of said footing of said shoulder piece; and wherein said at least one protrusion and said at least two indentations are sized and dimensioned to mate with one another such that said base piece and said shoulder piece are held in place with respect to one another when said at least one protrusion and at least one of said at least two indentations are mated, but such that said base piece and said shoulder piece are adjustable into at least two positions by moving said base piece relative to said shoulder piece;

a male street accessory fitting:

comprising first, second, and third openings formed by first, second, and third bodies, respectively;

wherein at least one of said first, second, and third bodies is a round male street body comprising a male street opening corresponding to the one of said first, second, and third openings formed by said round male street body and an external step extending up said round male street body toward said male street opening, and ending such that there is sufficient space between said external step and a female fitting hub being connected to said round male body that soldering can occur;

wherein said circular pipe opening of said at least one two-piece flange is able to be connected with one of said first, second, and third openings of said male street accessory fitting that is not the one of said first, second, and third openings being connected to the female fitting hub.

14. The two-piece flange system as claimed in claim 13, wherein said male street accessory fitting comprises a tee-shape such that two of said first, second, and third bodies are connected to one another through a first run, and wherein a second branch extends perpendicularly from said first run and the remaining of said first, second, and third bodies is disposed on said second branch.

15. The two-piece flange system as claimed in claim 13, wherein:

said first body of said male street accessory fitting comprises an exterior that is one of a group consisting of threaded and sweat; and said system further comprises a tap fitting with an interior designed to mate with said exterior of said first body;

wherein when said exterior of said first body of said male street accessory fitting is threaded, said tap fitting is screwed onto said first body of said male street accessory fitting; and wherein when said exterior of said first body of said male street accessory fitting is sweat, said system further comprises soldering to join said first body of said male street accessory fitting and said tap fitting.

16. The two-piece flange system as claimed in claim 13, further comprising at least one ball valve attachable to said shoulder piece of said at least one two-piece flange.

17. The two-piece flange system as claimed in claim 13, further comprising a circulator comprising a circulator volute flange on either side of said circulator, wherein said circulator volute flange is attachable to said base piece of said at least one two-piece flange.

18. A two-piece flange system, comprising:
at least one two-piece flange comprising:
a base piece comprising:
a top;
a bottom;
a shoulder piece opening extending through said top and said bottom; and
a recessed portion surrounding said shoulder piece opening and extending partway between said top and said bottom of said base piece, such that said bottom of said base piece is smaller in area than said top of said base piece;
a shoulder piece comprising:
a circular footing sized and dimensioned to fit snugly within said shoulder piece opening of said base piece, comprising an outer edge;
a lip sized and dimensioned to fit snugly within said recessed portion of said base piece and designed to catch said base piece so that said shoulder piece is held within said shoulder portion of said base piece;
a circular pipe opening extending upward and perpendicularly away from said footing; and
an exterior and an interior surrounding said pipe opening;
at least two indentations cut away from one of a group consisting of said outer edge of said footing of said shoulder piece and said top of said shoulder piece opening of said base piece;
at least one protrusion protruding from one of a group consisting of said outer edge of said footing of said shoulder piece and said top of said shoulder piece opening of said base piece;
wherein if said at least two indentations are cut away from said outer edge of said footing of said shoulder piece, then said at least one protrusion protrudes from said top of said shoulder piece opening of said base piece and wherein if said at least two indentations are cut away from said top of said shoulder piece opening of said base piece, then said at least one protrusion protrudes from said outer edge of said footing of said shoulder piece; and
wherein said at least one protrusion and said at least two indentations are sized and dimensioned to mate with one another such that said base piece and said shoulder piece are held in place with respect to one another when said at least one protrusion and at least one of said at least two indentations are mated, but such that said base piece and said shoulder piece are adjustable into at least two positions by moving said base piece relative to said shoulder piece;
a male street accessory fitting:
comprising first, second, and third openings formed by first, second, and third bodies, respectively;
wherein at least one of said first, second, and third bodies is a round male street comprising a male street opening corresponding to the one of said first, second, and third openings formed by said round male street body and an external step extending up said round male street body toward said male street opening, and ending such that there is sufficient space between said external step and a female fitting hub being connected to said round male body that soldering can occur; and
a circulator comprising a circulator volute flange on either side of said circulator, wherein one of said circulator volute flanges is attachable to said base piece of said at least one two-piece flange and the other of said circular volute flanges is attachable to one of said first, second, and third openings of said male street accessory fitting that is not the one of said first, second, and third openings being connected to the female fitting hub.

19. The two-piece flange system as claimed in claim 18, wherein said male street accessory fitting comprises a tee-shape such that two of said first, second, and third bodies are connected to one another through a first run, and wherein a second branch extends perpendicularly from said first run and the remaining of said first, second, and third bodies is disposed on said second branch.

20. The two-piece flange system as claimed in claim 18, wherein:
said first body of said male street accessory fitting comprises an exterior that is one of a group consisting of threaded and sweat; and
said system further comprises a tap fitting with an interior designed to mate with said exterior of said first body;
wherein when said exterior of said first body of said male street accessory fitting is threaded, said tap fitting is screwed onto said first body of said male street accessory fitting; and
wherein when said exterior of said first body of said male street accessory fitting is sweat, said system further comprises soldering to join said first body of said male street accessory fitting and said tap fitting.

21. The two-piece flange system as claimed in claim 18, further comprising at least one ball valve attachable to said shoulder piece of said at least one two-piece flange.

22. A two-piece flange system, comprising:
at least one two-piece flange comprising:
a screw;
a base piece comprising:
a top;
a bottom;
a shoulder piece opening extending through said top and said bottom;
a recessed portion surrounding said shoulder piece opening and extending partway between said top and said bottom of said base piece, such that said bottom of said base piece is smaller in area than said top of said base piece; and
at least one base screw hole drilled parallel to and between said top and said bottom of said base piece and above said recessed portion of said base piece, wherein said at least one base screw hole is of a size to accept said screw; and
a shoulder piece comprising:
a circular footing sized and dimensioned to fit snugly within said shoulder piece opening of said base piece, comprising an outer edge;
a lip sized and dimensioned to fit snugly within said recessed portion of said base piece and designed to catch said base piece so that said shoulder piece is held within said shoulder portion of said base piece;
a circular pipe opening extending upward and perpendicularly away from said footing;
an exterior and an interior surrounding said pipe opening;

at least two shoulder screw holes drilled parallel to said footing of said shoulder piece and above said lip of said shoulder piece, wherein said at least two shoulder screw holes are of a size to accept said screw;

wherein said at least two shoulder screw holes and said at least one base screw hole are positioned within said shoulder piece and said base piece, respectively, such that said at least one base screw hole is able to align with each of said at least two shoulder screw holes by moving said base piece and said shoulder piece relative, such that said screw is able to penetrate through said at least one base screw hole and into said one of said at least two shoulder screw holes with which said at least one base screw hole is aligned;

a male street accessory fitting:
comprising first, second, and third openings formed by first, second, and third bodies, respectively;
wherein at least one of said first, second, and third bodies is a round male street body comprising a male street opening corresponding to the one of said first, second, and third openings formed by said round male street body and an external step extending up said round male street body toward said male street opening, and ending such that there is sufficient space between said external step and a female fitting hub being connected to said round male body that soldering can occur; and a circulator comprising a circulator volute flange on either side of said circulator, wherein one of said circulator volute flanges is attachable to said base piece of said at least one two-piece flange and the other of said circulator volute flanges is attachable to one of said first, second, and third openings of said male street accessory fitting that is not the one of said first, second, and third openings being connected to the female fitting hub.

23. The two-piece flange system as claimed in claim 22, wherein said male street accessory fitting comprises a tee-shape such that two of said first, second, and third bodies are connected to one another through a first run, and wherein a second branch extends perpendicularly from said first run and the remaining of said first, second, and third bodies is disposed on said second branch.

24. The two-piece flange system as claimed in claim 22, wherein:
said first body of said male street accessory fitting comprises an exterior that is one of a group consisting of threaded and sweat; and
said system further comprises a tap fitting with an interior designed to mate with said exterior of said first body;
wherein when said exterior of said first body of said male street accessory fitting is threaded, said tap fitting is screwed onto said first body of said male street accessory fitting; and
wherein when said exterior of said first body of said male street accessory fitting is sweat, said system further comprises soldering to join said first body of said male street accessory fitting and said tap fitting.

25. The two-piece flange system as claimed in claim 22, further comprising at least one ball valve attachable to said shoulder piece of said at least one two-piece flange.

* * * * *